Oct. 28, 1958    F. HUHN    2,857,788
DRILLING MACHINE
Filed March 5, 1956    20 Sheets-Sheet 1

INVENTOR.
FRITZ HUHN
BY
ATTORNEY.

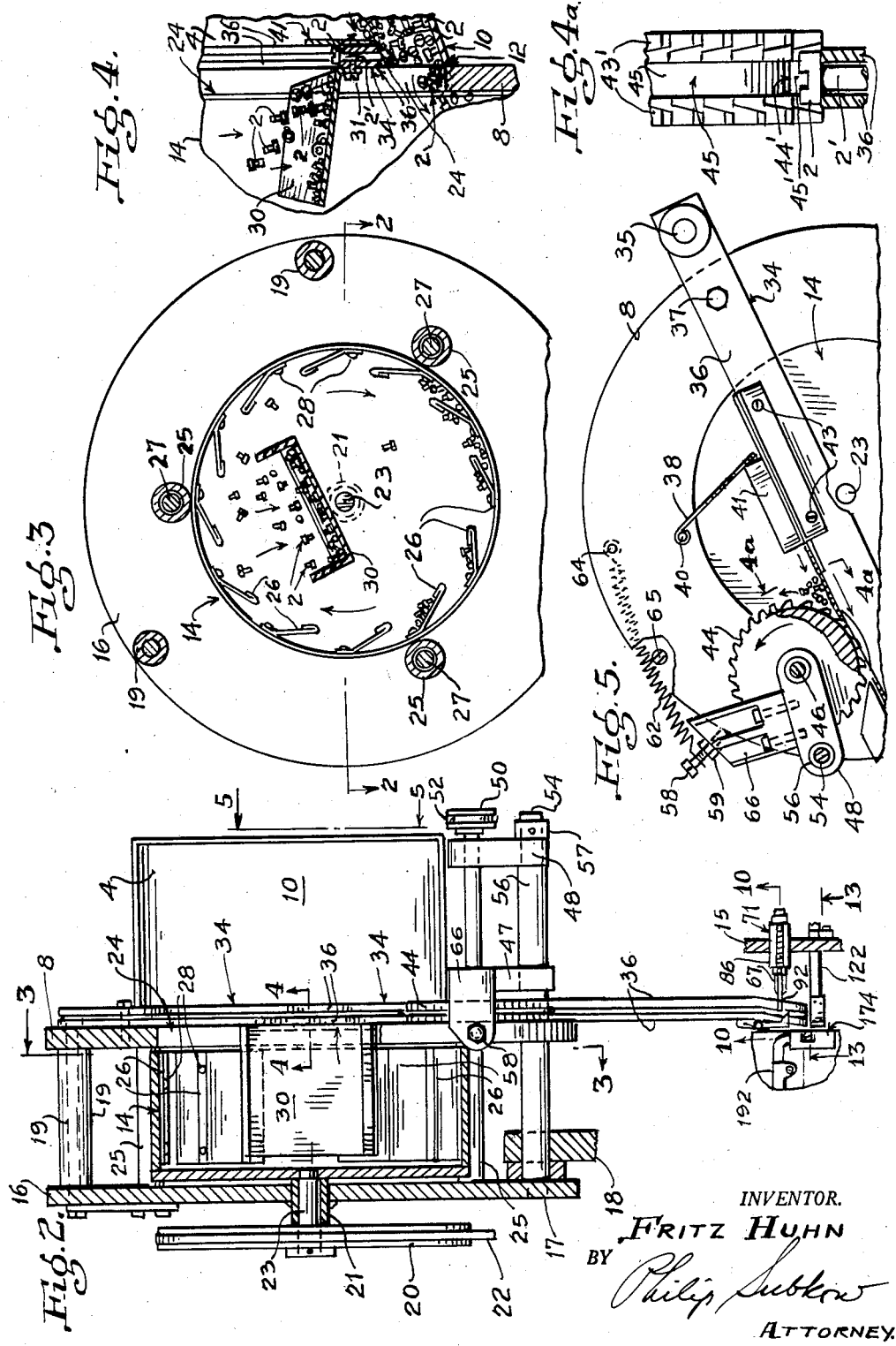

Oct. 28, 1958 F. HUHN 2,857,788
DRILLING MACHINE
Filed March 5, 1956 20 Sheets-Sheet 3
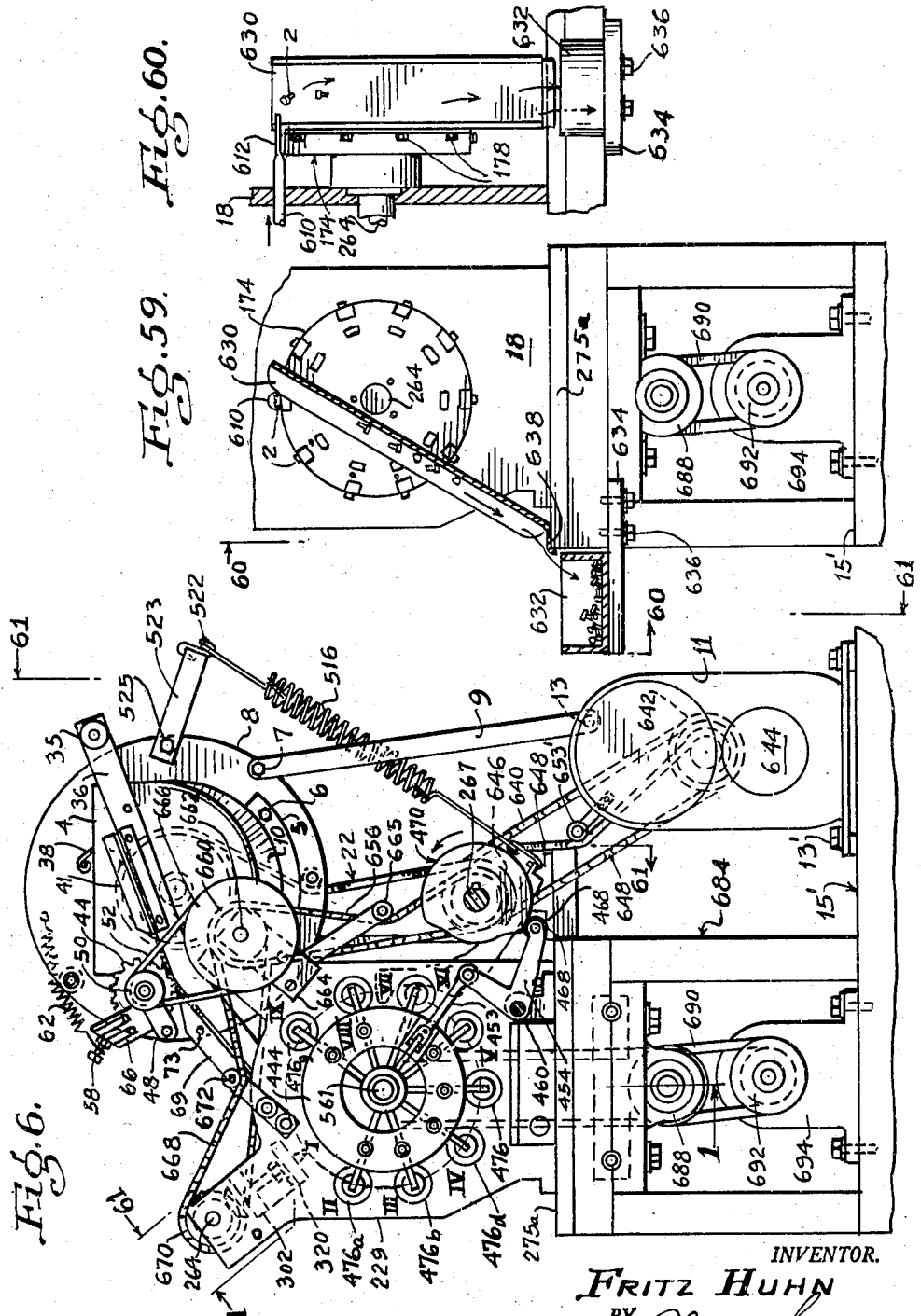
INVENTOR.
FRITZ HUHN
BY
ATTORNEY.

Oct. 28, 1958        F. HUHN        2,857,788

DRILLING MACHINE

Filed March 5, 1956        20 Sheets-Sheet 4

Fig. 7.

INVENTOR.
FRITZ HUHN
BY
ATTORNEY.

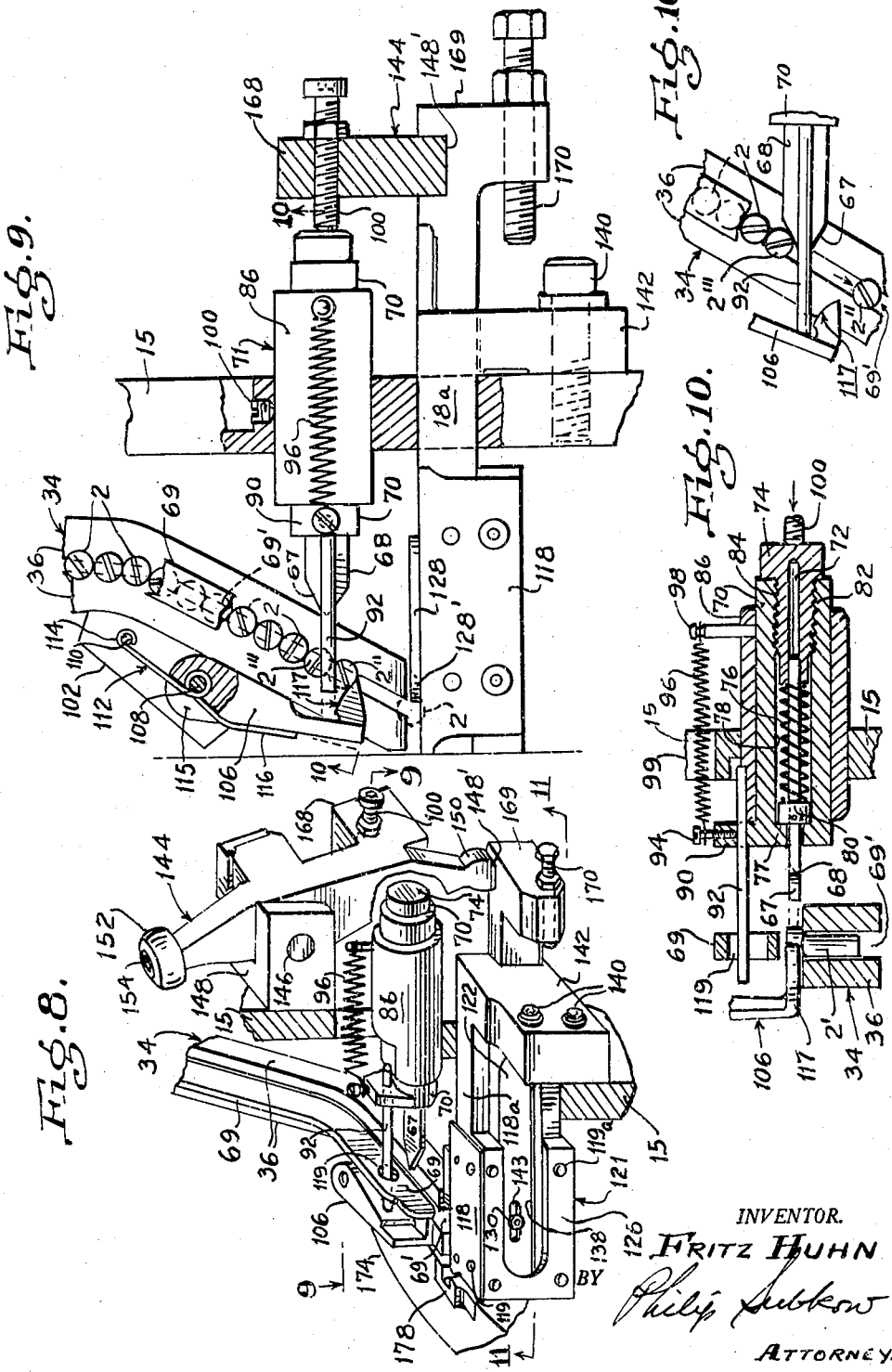

Oct. 28, 1958 F. HUHN 2,857,788
DRILLING MACHINE
Filed March 5, 1956 20 Sheets-Sheet 6
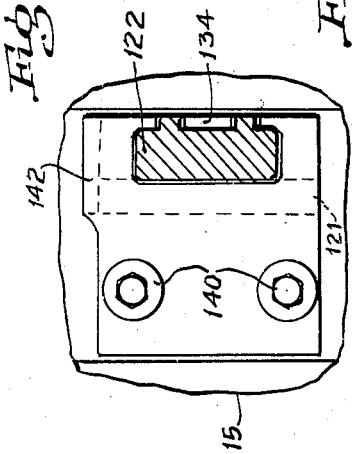
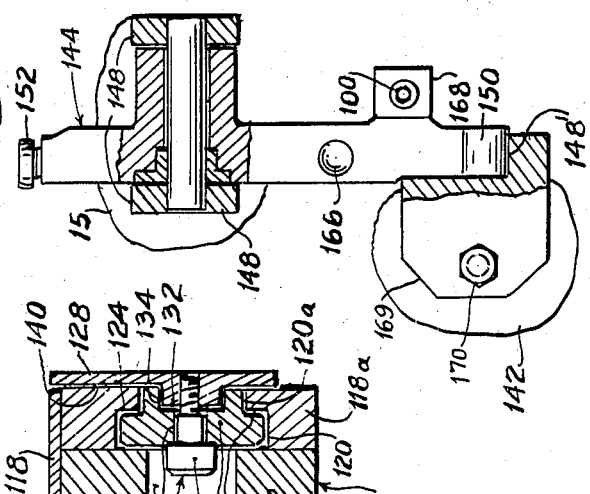
INVENTOR.
FRITZ HUHN
BY Philip Subkow
ATTORNEY

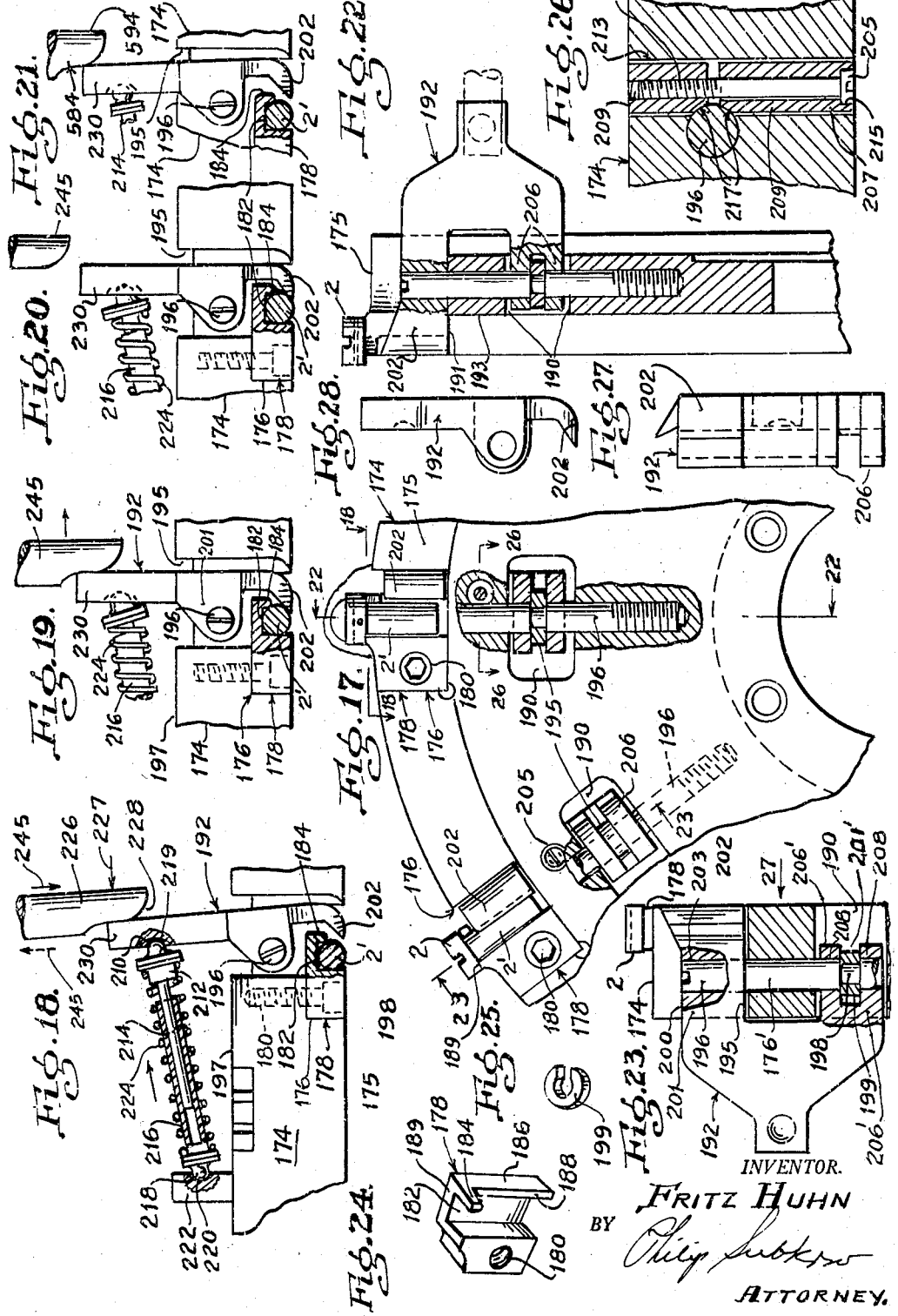

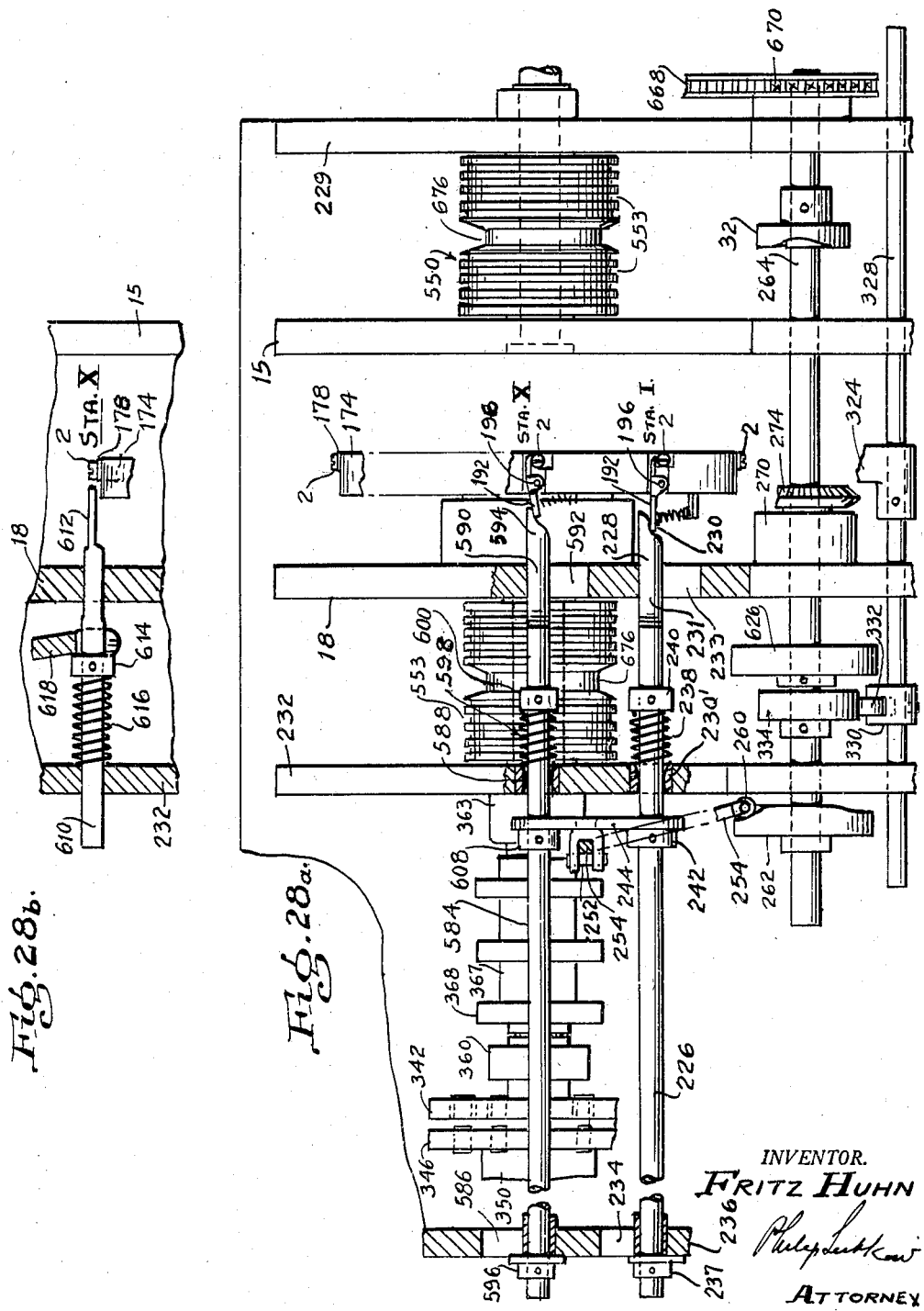

Oct. 28, 1958   F. HUHN   2,857,788
DRILLING MACHINE
Filed March 5, 1956   20 Sheets-Sheet 9
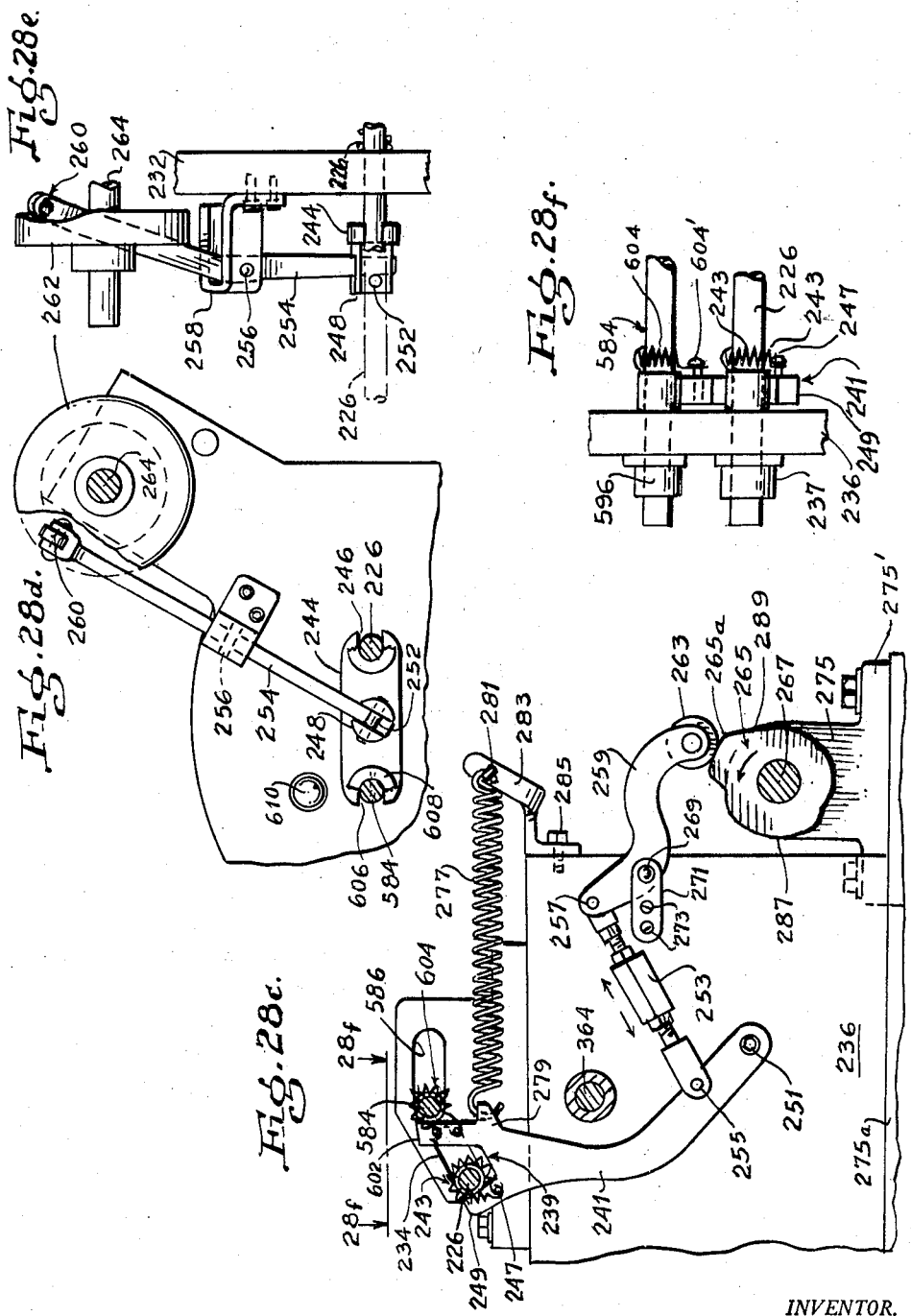
INVENTOR.
FRITZ HUHN
BY
ATTORNEY.

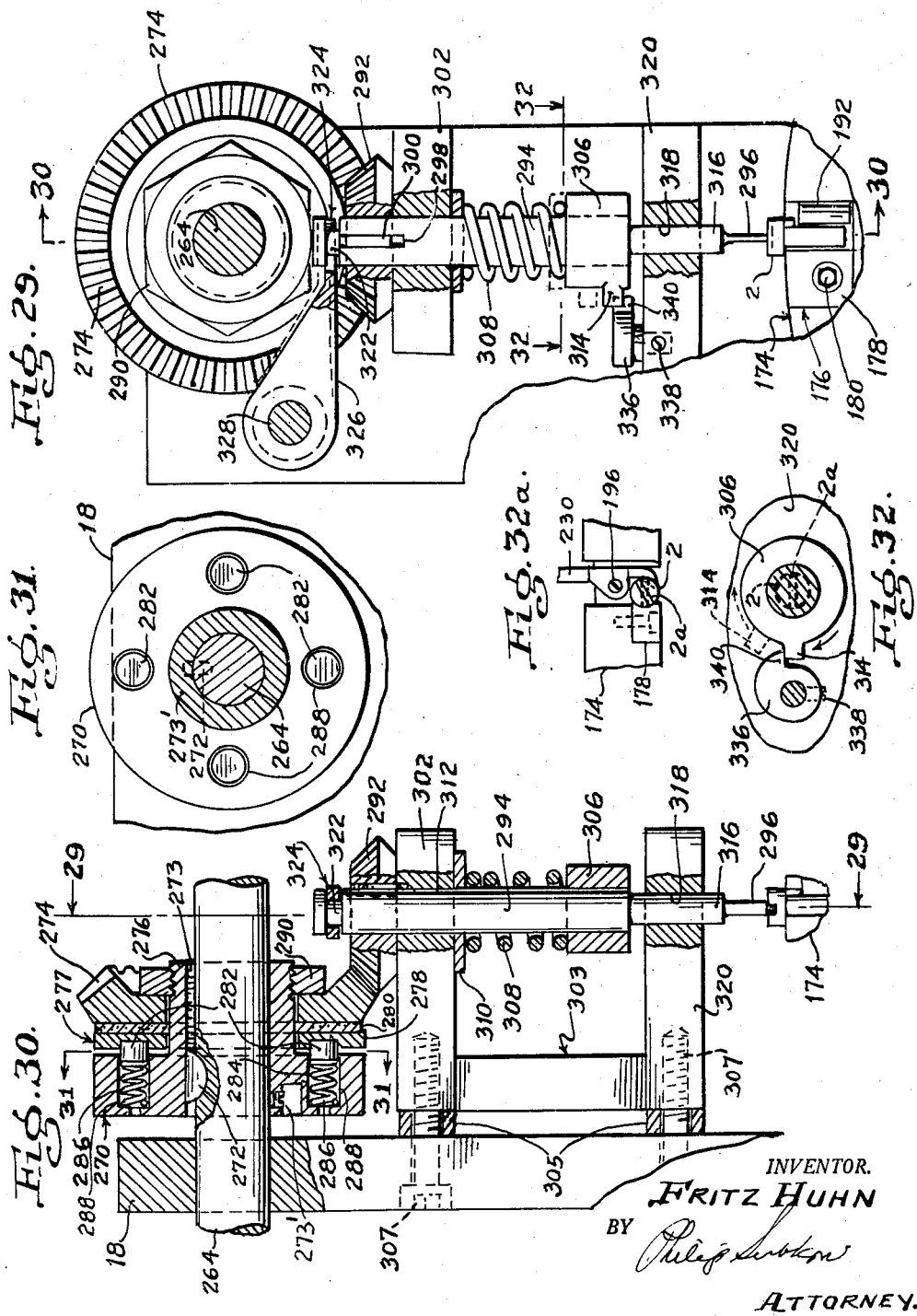

Oct. 28, 1958 F. HUHN 2,857,788
DRILLING MACHINE
Filed March 5, 1956 20 Sheets-Sheet 11

INVENTOR.
FRITZ HUHN
BY
ATTORNEY.

Oct. 28, 1958 F. HUHN 2,857,788
DRILLING MACHINE
Filed March 5, 1956 20 Sheets-Sheet 12
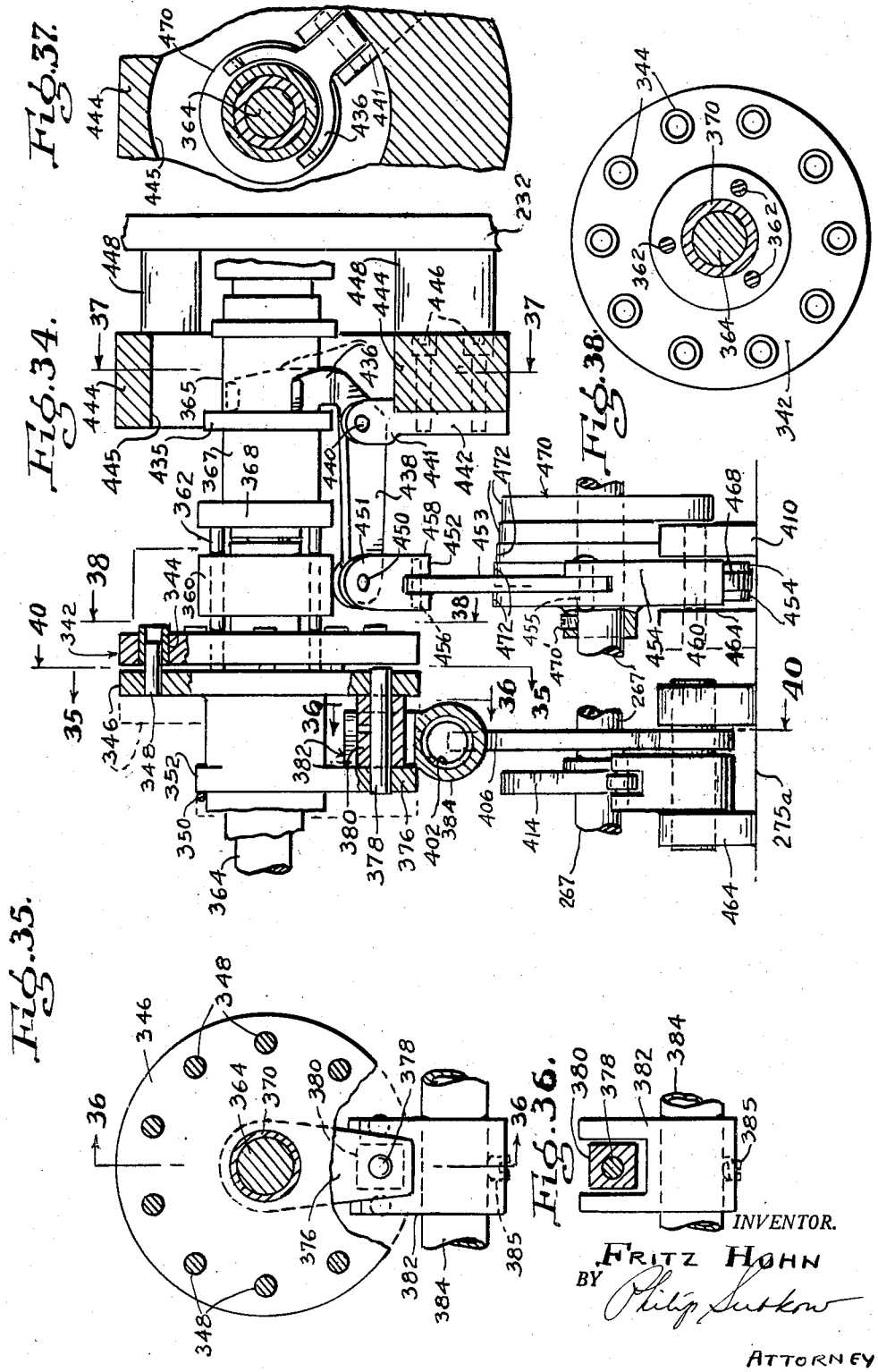
INVENTOR.
FRITZ HUHN
BY
ATTORNEY

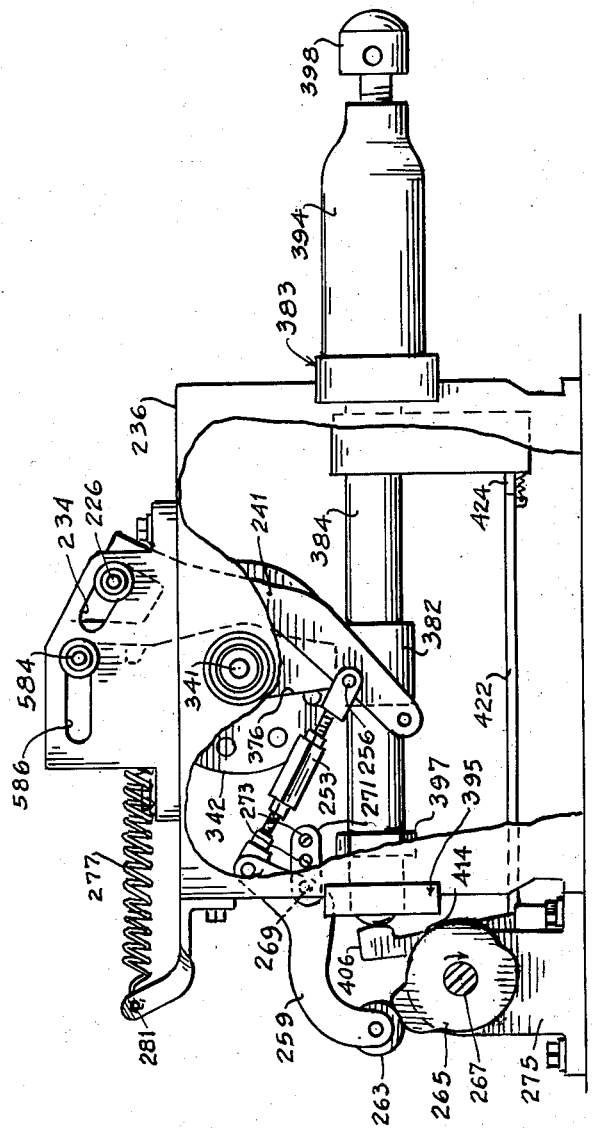

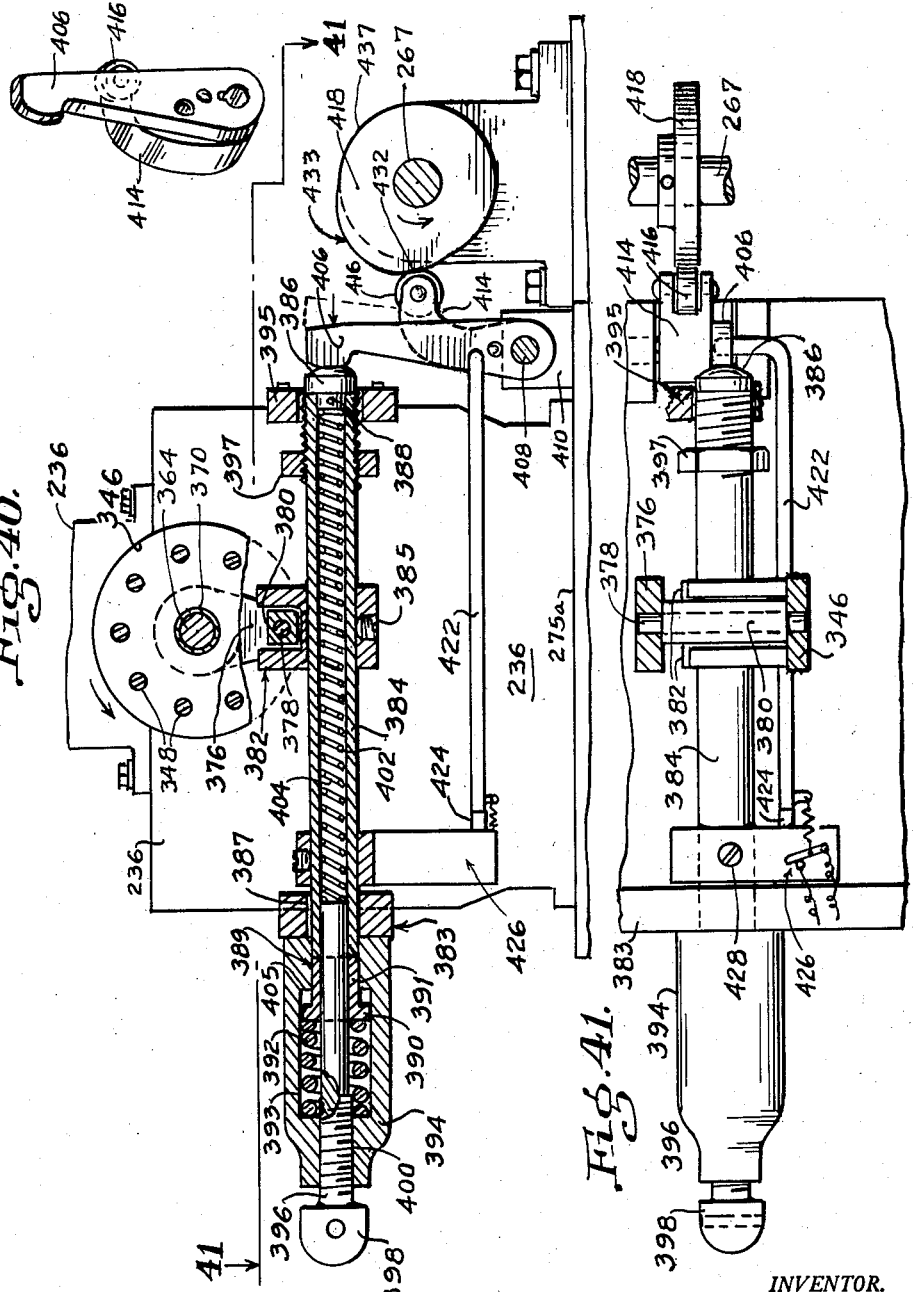

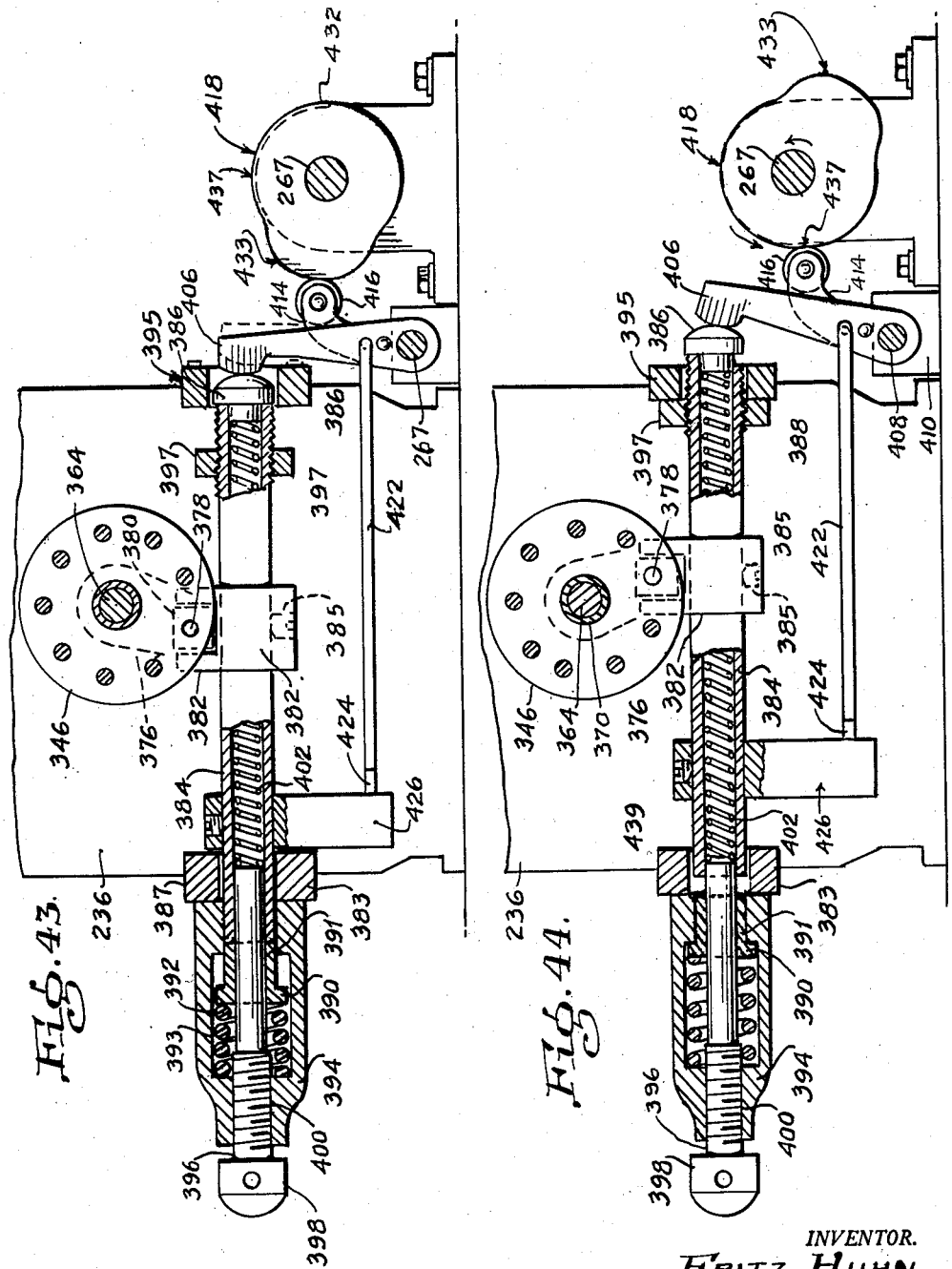

Oct. 28, 1958　　　F. HUHN　　　2,857,788
DRILLING MACHINE
Filed March 5, 1956　　　20 Sheets-Sheet 16
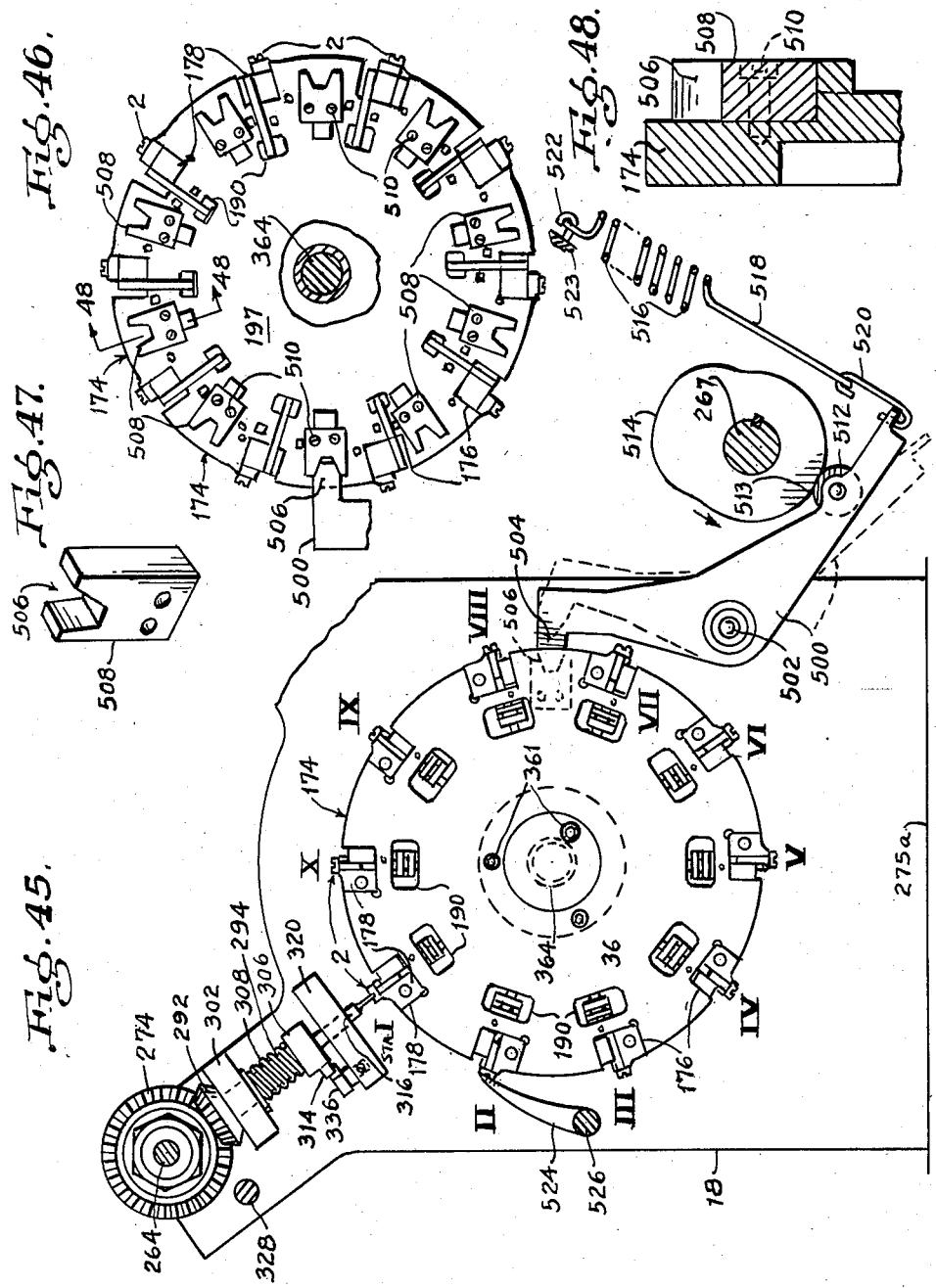
INVENTOR.
FRITZ HUHN
BY
ATTORNEY.

Oct. 28, 1958  F. HUHN  2,857,788
DRILLING MACHINE
Filed March 5, 1956  20 Sheets-Sheet 17
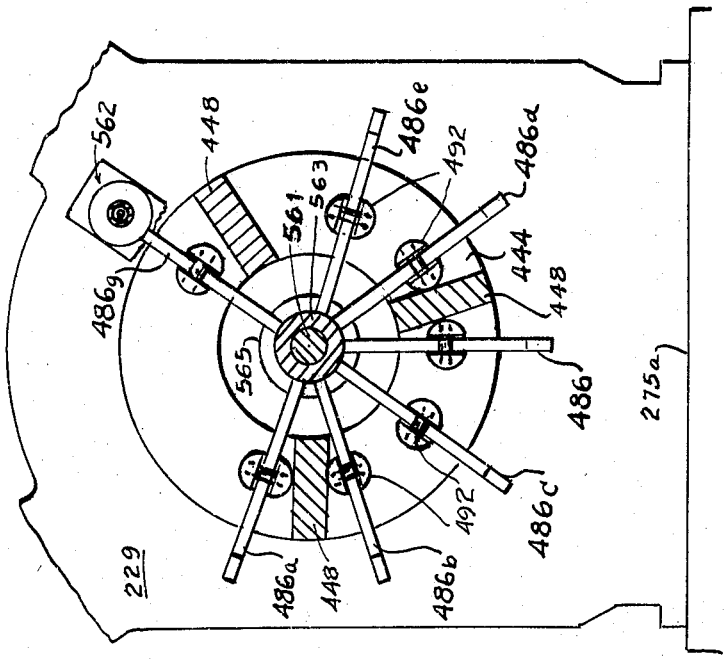
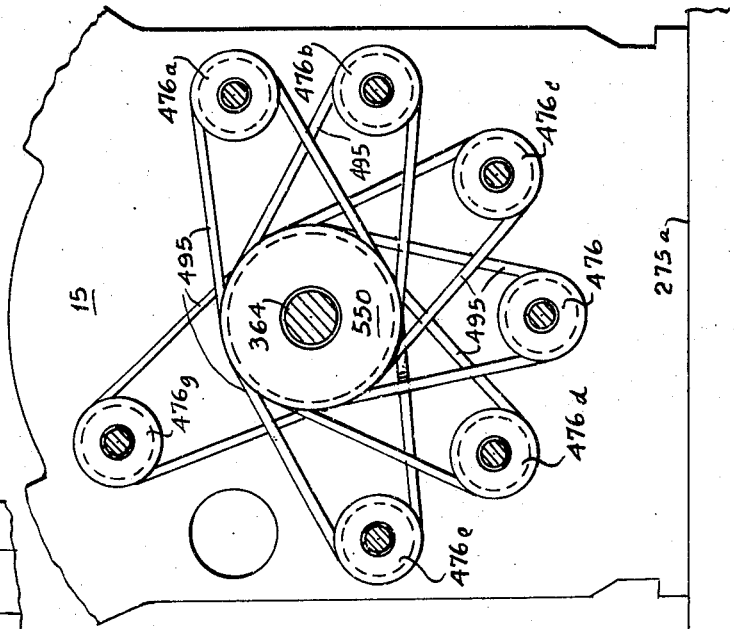
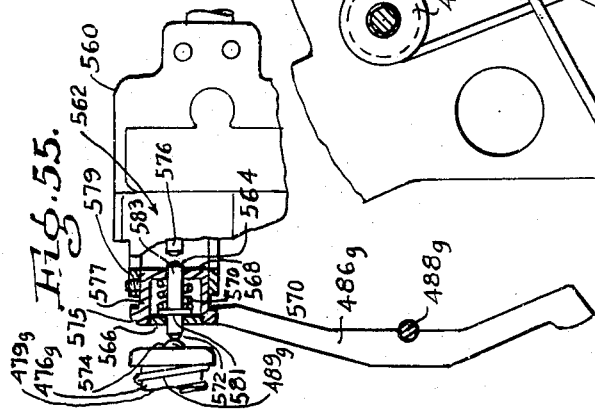
INVENTOR.
FRITZ HUHN
BY
ATTORNEY.

Oct. 28, 1958  F. HUHN  2,857,788
DRILLING MACHINE
Filed March 5, 1956  20 Sheets-Sheet 18
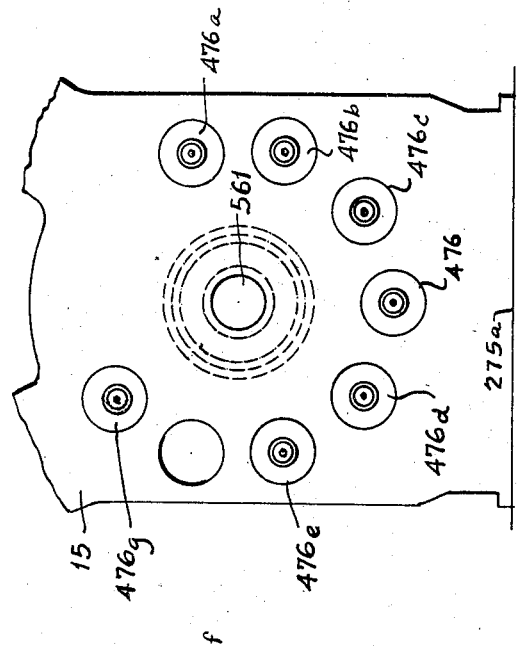
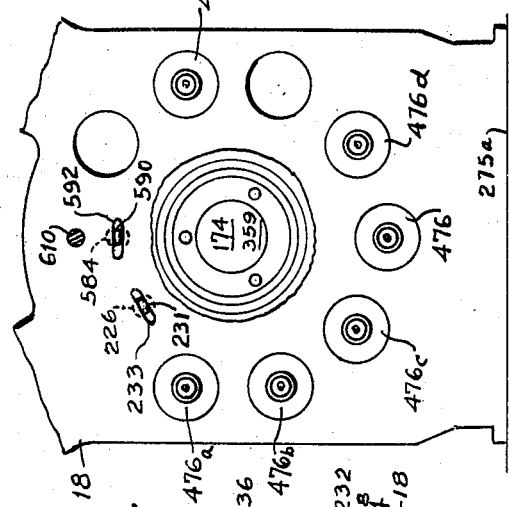
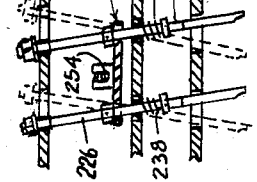
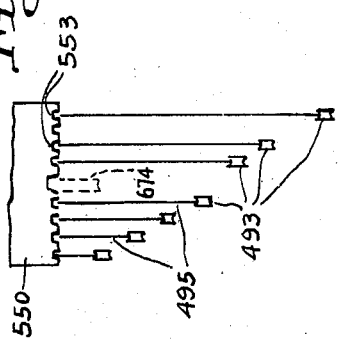
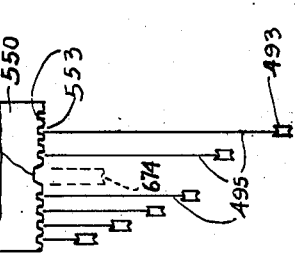
INVENTOR.
FRITZ HUHN
BY
ATTORNEY.

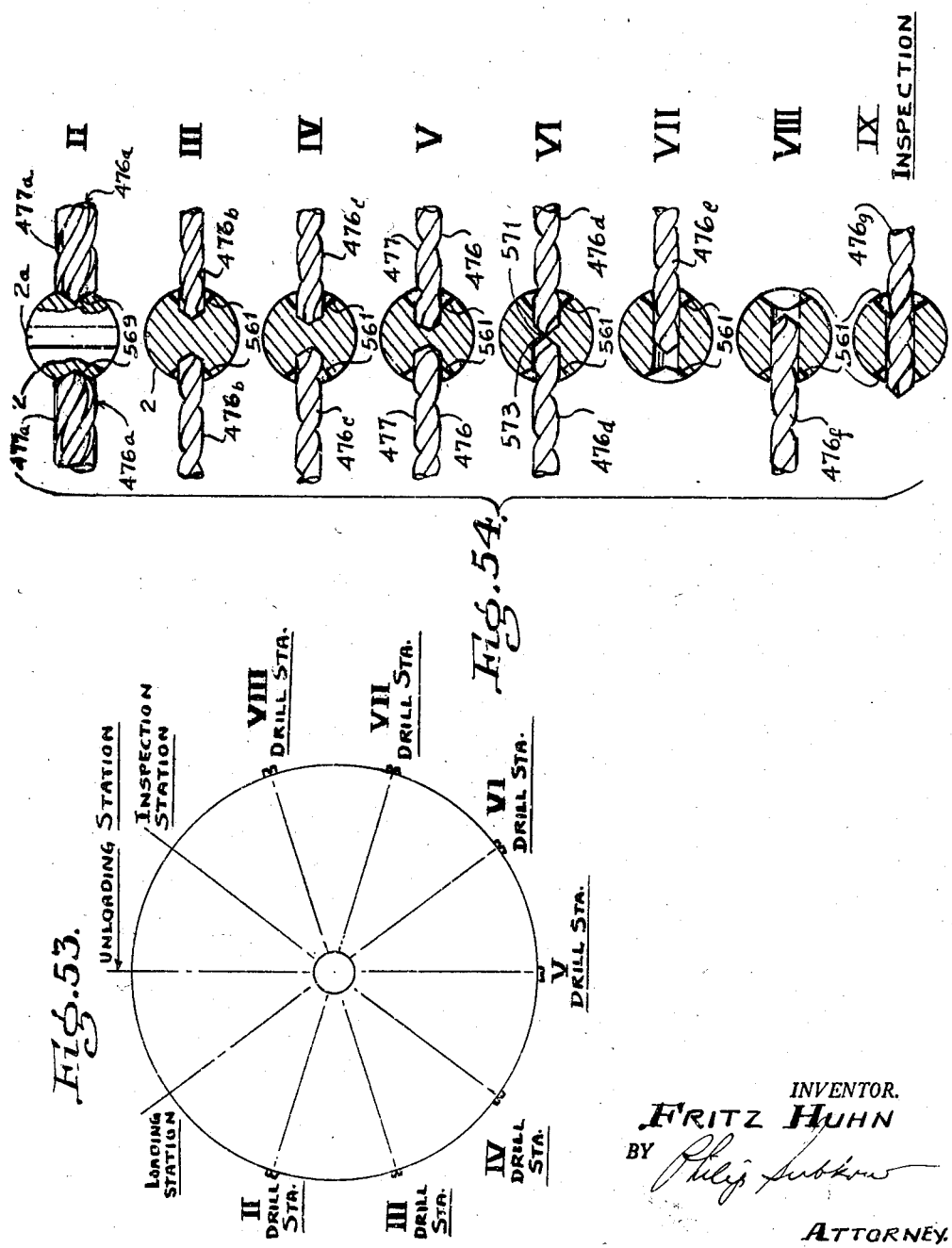

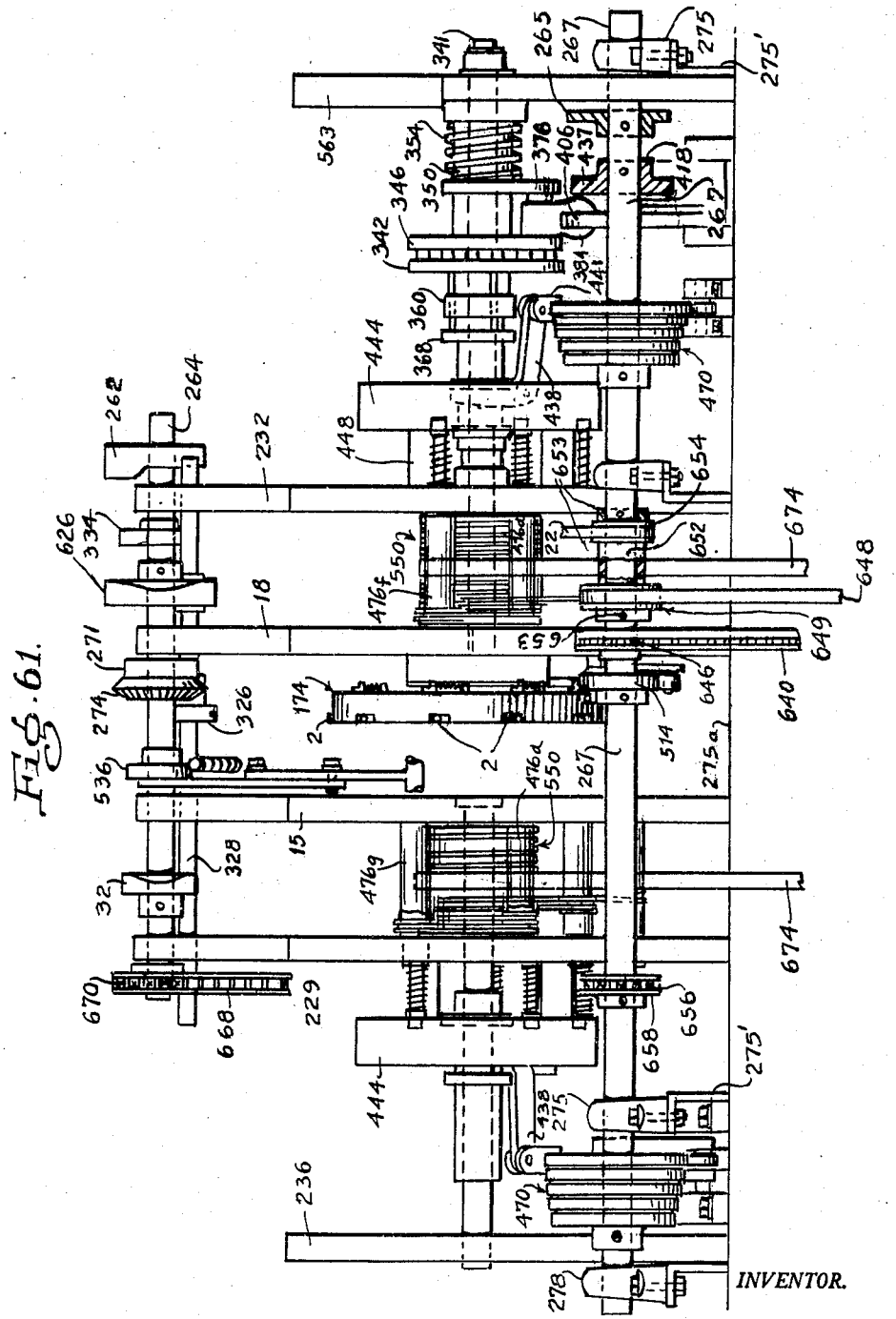

United States Patent Office 2,857,788
Patented Oct. 28, 1958

2,857,788

DRILLING MACHINE

Fritz Huhn, South Pasadena, Calif., assignor to Vigon, Inc., a corporation of California Application March 5, 1956, Serial No. 569,665

31 Claims. (Cl. 77—5)

This invention relates to a machine for automatically drilling a hole in the head of a fastener, particularly a fillister head screw.

In certain uses of screws where the screw is subject to a substantial amount of vibration, as when employed in aircraft, it is often necessary to utilize means to prevent the screws from dangerously loosening and becoming disengaged. Hence, it has become customary in many instances where the screws in a structure are subject to vibration, to tie the screws down so that they cannot rotate and become loose. This is often done by fastening wires to the heads of the screws and anchoring such wires. A convenient and rapid way of accomplishing this is to bore a hole in the head of the screws, enabling the wire to pass through these holes, the wire thus being connected to a series of such screws in the aforementioned manner. This permits little or substantially no rotation of the screws so engaged by the wire, and even if a small amount of rotation does occur, it will not be sufficient to permit the screw to loosen to any dangerous extent.

One object of this invention is accordingly the provision of an automatic machine for properly positioning a headed fastener and drilling a hole in the head thereof.

Another object is to provide a machine having a plurality of means (1) to present a screw in position for drilling a hole through the head thereof, (2) to orient the screw so that the hole can be drilled at a predetermined angle, preferably at right angles, to the slot in the head of the screw, (3) to drill such a hole in a direction preferably transverse to the axis of the screw, (4) to insure that the hole is properly drilled completely through the screw head, and (5) to eject the screw from the machine following the drilling operations, all of said means operating in timed automatic sequence.

A further object of the invention is the provision in a drilling machine of the aforementioned type, of a novel device for supporting the screws to be drilled for movement thereof from one operating station to another, said device being in the form of a disc or dial designed to support a plurality of screws for simultaneous operation on each of the screws at the various operating stations positioned about such disc.

Still another object is the provision in a drilling machine of the aforementioned type, of a novel screw driver mechanism for orienting a screw carried on a support member so as to position the slot in said screw preferably at right angles to the hole to be bored in the head thereof, and to position the slots of a plurality of said screws on said movable support, in alignment with each other.

A still further object is the provision in a machine of the aforementioned character, of a mechanism for actuating gripper members on the movable support for the screws to open and close said gripper members, said members being designed to hold the respective screws in position on said movable support during the drilling operations.

Still another object of the invention is the provision of novel means for intermittently rotating said movable support or dial for the screws, to present a plurality of screws thereon to individual operating stations, including a feed station, a plurality of drilling stations, an inspection station and a discharge station, all located at spaced intervals about the periphery of said dial.

Yet another object is to provide in the aforementioned drilling machine, novel means for actuating a plurality of drills located on opposite sides of the movable support or dial for the screws, so as to advance said drills from opposite sides of the movable support into the head of a screw, and to retract said drills from the movable member so as to permit rotation thereof following the drilling operation.

A still further object is the provision in the aforementioned drilling machine, of an inspection drill positioned at a station beyond the last drill station, said inspection drill being designed to pass through the bore in the screw head, and a mechanism associated with said inspection drill to stop the machine if the inspection drill strikes an obstruction in said bore, indicating that the bore has not been properly drilled.

Other objects and advantages will be apparent from the following description of the invention.

The machine broadly comprises a hopper into which screws are fed, a movable member, preferably in the form of a disc, for supporting a plurality of screws during the operations of orienting each screw and drilling a hole in the head thereof, said member being movable, preferably rotatable, to a plurality of operating positions, a conveyor between the hopper and the movable member for charging the screws to said member, and means for feeding the screws in timed, uniform succession from the conveyor to the movable member. The movable support member is provided with gripping elements to hold the screws in position thereon during the orienting and drilling operations. At the feed station, means are provided to actuate or open the gripper element on the movable support member adjacent said feed station to permit feeding a screw to said support member, and to partially close the gripper against said screw to permit rotation of said screw during the subsequent screw orienting operations.

A screw driver means is positioned adjacent the movable support member at the location where said member first receives a screw from the conveyor, said screw driver means being operative to engage the screw head and rotate it to a predetermined oriented position. A plurality of drills are positioned in spaced relation adjacent the movable member, the slots in the heads of the screws being preferably aligned and oriented on the support member in a direction normal to the drills, by the screw driver means. Means are supplied to intermittently move or rotate said support member with a screw in position thereon to each of a plurality of stations adjacent the respective drills, the movable member remaining stationary for a preselected period at each of said stations. A majority of said drills are arranged in sets on opposite sides of the movable member at the various stations so as to drill a hole from opposite directions at each station into the screw head transversely to the axis of the screw and to the slot therein. Means are provided to permit the sets of drills at each succeeding station to drill the hole successively deeper from opposite directions of the screw head toward the center thereof, until a hole is drilled completely through the screw head.

One or more probing and/or inspection drills at succeeding stations to which the movable member is displaced enter and probe the drilled holes to insure that each hole has been properly and completely drilled before the screw is ejected, and in the event the hole is incompletely bored, means are provided which are actuated by an inspection drill to shut the machine off. At the final station of the movable screw supporting member, means are provided to disengage the screw gripper element holding the screw in position on the movable member, and an ejecting means is provided which discharges the screw from the movable member into a receptacle, thus completing the cycle of operations. The movable support or dial is designed to carry a plurality of screws each being simultaneously operated upon at the various stations to which said support is intermittently rotated.

The invention will be more clearly understood by reference to the description below of a preferred embodiment taken in connection with the accompanying drawings wherein:

Fig. 2 is a horizontal section taken on line 2—2 of Fig. 1 and also taken on line 2—2 of Fig. 3.

Fig. 3 is a vertical section taken on line 3—3 of Fig. 2.

Fig. 4 is a partial vertical section taken on line 4—4 of Fig. 2.

Fig. 4a is a partial section taken on line 4a—4a of Fig. 5.

Fig. 5 is a view taken on line 5—5 of Fig. 2.

Fig. 6 is an end elevational view of the assembled machine taken on line 6—6 of Fig. 1.

Fig. 7 is an enlarged view of the left hand portion of the machine as shown in Fig. 1, with certain parts shown in section.

Fig. 8 is a perspective detailed view showing the escapement mechanism and shuttle plate mechanism.

Fig. 9 is a horizontal sectional view of the assembly shown in Fig. 8 and taken on line 9—9 thereof.

Fig. 10 is a vertical section taken on line 10—10 of Fig. 9 and Fig. 2.

Fig. 10a is a detail of the escapement mechanism of Fig. 9, shown in a position for releasing a screw.

Fig. 11 is an elevational view partly in section taken on line 11—11 of Fig. 8.

Fig. 12 is an irregular horizontal section taken on line 12—12 of Fig. 11.

Fig. 13 is an irregular section taken on line 13—13 of Fig. 12.

Fig. 14 is an enlarged vertical section taken on line 14—14 of Fig. 12.

Fig. 15 is an enlarged vertical section of the shuttle plate assembly taken on line 15—15 of Fig. 12.

Fig. 16 is a vertical section taken on line 16—16 of Fig. 11.

Fig. 17 is a fragmentary side elevational view of the dial with certain parts in section.

Fig. 18 is a fragmentary plan view of a portion of the dial taken on line 18—18 of Fig. 17, with the gripper in fully retracted position.

Fig. 19 is a view similar to Fig. 18 with the gripper in partially retracted position.

Fig. 20 is a view similar to Figs. 18 and 19, with the gripper in full gripping contact with a screw.

Fig. 21 is a view similar to Figs. 18 to 20 with the gripper again fully retracted for ejection of a screw from the dial.

Fig. 22 is a section taken on line 22—22 of Fig. 17.

Fig. 23 is a section taken on line 23—23 of Fig. 17.

Fig. 24 is a detailed perspective view of the chucks in the dial for supporting the work screws therein.

Fig. 25 is a detailed perspective of the locking ring for the gripper.

Fig. 26 is a horizontal section of the dial taken on line 26—26 of Fig. 17.

Fig. 27 is an elevational view of the gripper shown in Fig. 23.

Fig. 28 is a plan view of the gripper shown in Figs. 23 and 27.

Fig. 28a is a plan view partly in section, taken on line 28a—28a of Fig. 7 with certain parts omitted and certain parts broken away for clarity.

Fig. 28b is a detail of the screw discharge device indicated by the arrow 28b in Fig. 7.

Fig. 28c is a vertical sectional view taken on line 28c—28c of Fig. 1.

Fig. 28d is a vertical section taken on line 28d—28d of Fig. 1.

Fig. 28e is a side elevation of the parts shown in Fig. 28d.

Fig. 28f is a plan view taken on line 28f—28f of Fig. 28c.

Fig. 29 is a vertical sectional view of the screw drive mechanism of the device taken on line 29—29 of Fig. 30.

Fig. 30 is a vertical section taken on line 30—30 of Fig. 29.

Fig. 31 is a sectional view taken on line 31—31 of Fig. 30.

Fig. 32 is a horizontal sectional view taken on line 32—32, of Fig. 29.

Fig. 32a is a fragmentary detail of the top of the dial showing the screw before the same has been oriented.

Fig. 34 is an enlarged elevational view with parts in section, of a portion of the mechanism for rotating the dial and operating the drills.

Fig. 35 is a vertical section taken on line 35—35 of Fig. 34.

Fig. 36 is a section taken on line 36—36 of Fig. 34.

Fig. 37 is a fragmentary section taken on line 37—37 of Fig. 34.

Fig. 38 is an irregular vertical section taken on line 38—38 of Fig. 34.

Fig. 39 is an end view of the machine taken on line 39—39 of Fig. 1, with parts omitted and parts broken away, showing the reciprocating rod and associated mechanism for actuating the dial.

Fig. 40 is a sectional view taken on line 40—40 of Fig. 34.

Fig. 41 is a plan view taken on line 41—41 of Fig. 40.

Fig. 42 is a detailed perspective view of the cam follower in Fig. 40.

Fig. 43 is a view similar to Fig. 40 showing the reciprocating rod moved to one extreme position.

Fig. 44 is a view similar to Fig. 43 showing the reciprocating rod displaced to the other extreme position.

Fig. 45 is a vertical section taken on line 45—45 of Figs. 1 and 7.

Fig. 46 is a view taken on line 46—46 of Fig. 7.

Fig. 47 is a detailed perspective view of a part on the dial.

Fig. 48 is an enlarged sectional view taken on line 48—48 of Fig. 46.

Fig. 49 is a vertical section taken on line 49—49 of Fig. 1.

Fig. 50 is a sectional view taken on line 50—50 of Fig. 1.

Fig. 51 is a section taken on line 51—51 of Fig. 1.

Fig. 52 is a section taken on line 52—52 of Figs. 1 and 7.

Fig. 53 is a schematic illustration of the various stations about the dial plate.

Fig. 54 is a schematic illustration of the relation of the various drills with respect to the work screws during the respective drilling operations.

Fig. 55 is a detail of the switch associated with the inspection drill.

Fig. 56 is a schematic illustration of the driving mechanism for the multiple drills on one side of the dial.

Fig. 57 is a schematic illustration of the driving mechanism for the multiple drills on the other side of the dial.

Fig. 58 is a schematic view showing the operation of the rocking rods for actuation of the grippers on the dial.

Fig. 59 is a section taken on line 59—59 of Fig. 1.

Fig. 60 is a front elevation taken on line 60—60 of Fig. 59.

Fig. 61 is a rear elevational view of the machine taken on line 61—61 of Fig. 6, with some parts removed.

Figure 1:
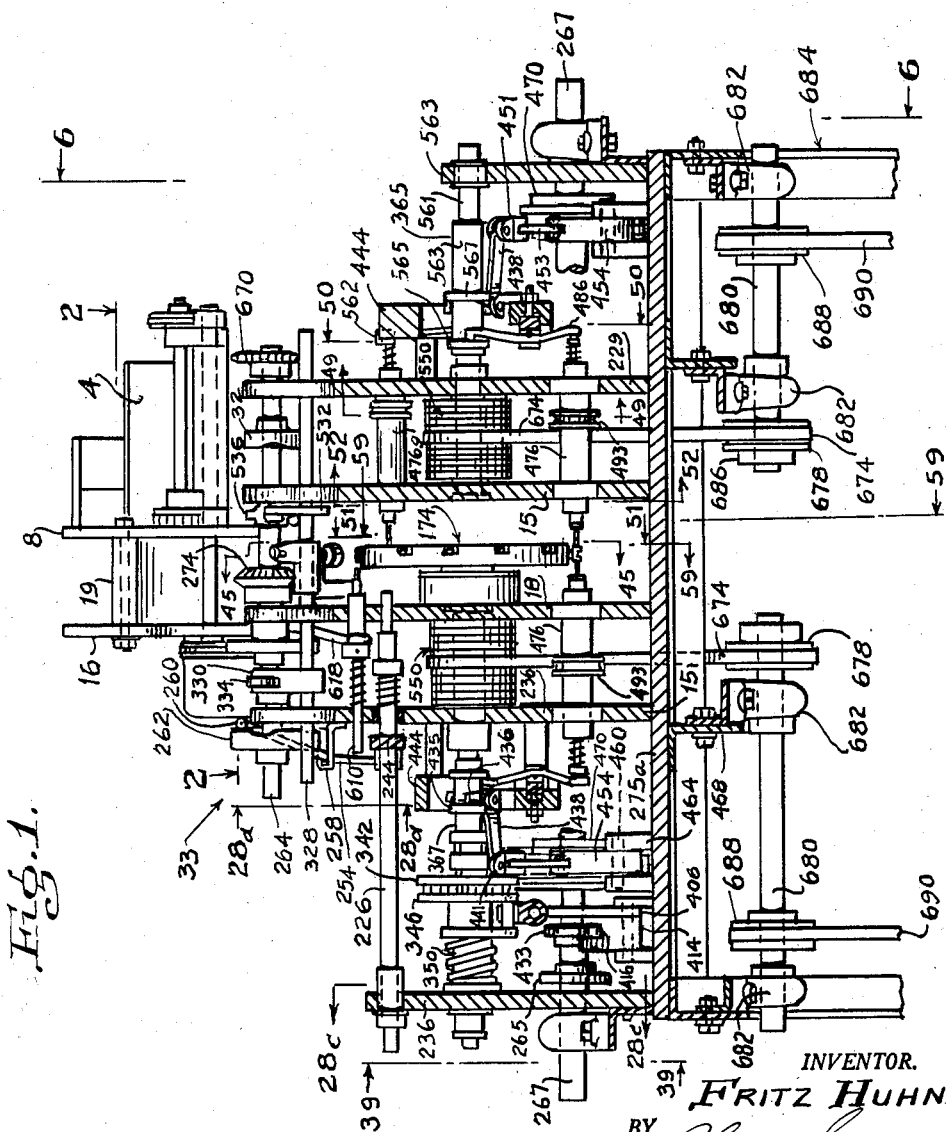
Fig. 1 is an irregular sectional view of the machine, in elevation, taken on line 1—1 of Fig. 6.

*Hopper and initial feed mechanism for the screws*

Referring particularly to Figs. 1 to 6, the screws to be drilled, designated by the numeral 2 (see Figs. 3 and 4) are placed in a hopper 4 having an arcuate flange 5 (see Fig. 6) connected by means of bolts 6 to a vertical plate 8 mounted by means of bolts 7 on a brace 9, the lower end of which is connected by bolts 13 to a motor block 11 bolted at 13' to the platform 15'. Plate 8 is supported at its opposite lower portion on a frame member 15 by means of bolts (not shown). The hopper 4 has a downwardly inclined bottom 10 (see Figs. 4 and 6) permitting the screws to pass by gravity toward an open portion 12 of the hopper in the lower end of the inner side thereof.

The screws then pass into a drum 14 (see particularly Figs. 2 and 3) positioned between plate 8 and a second parallel vertical plate 16 which is maintained in spaced relation to plate 8 by means of a series of circumferential spacers 19. Plate 16 is supported at its lower end 17 on a frame member or bearing plate 18 (see Fig. 1) by bolts (not shown). The drum 14 is mounted for rotation on shaft 23 (see Fig. 2) positioned in a bearing sleeve 21 on plate 16. On the end of shaft 23 is fixed a pulley 20 driven by a belt 22. The rotatable drum 14 is open at its side 24 adjacent the opening 12 on the inner side of the hopper 4. About the inner periphery of drum 14 are positioned a series of spaced vanes 26 connected at one end by means of bolts 28 to the drum. The drum 14 is also supported for rotation on rollers 25 mounted on support rods 27 mounted between plates 8 and 16.

The screws 2 pass by gravity from the lower end of the hopper 4 through openings 12 and 24 into the bottom of drum 14, and as the drum rotates, as indicated on Fig. 3, the screws are picked up on the vanes 26 at the bottom of the drum and are carried upward toward the top of the drum, at which time they fall by gravity from the vanes downward into the drum, a portion of the screws falling into an inclined and downwardly sloping pan 30 connected at its lower end by bolts 31 to a trough or guide 34. The pan 30 extends into drum 14 somewhat above the center thereof.

As seen most clearly in Fig. 4, the screws pass down the inclined pan 30 to the upper end of an inclined trough 34 formed by two vertical parallel plates or rails 36 spaced sufficiently apart by means of spacer members 35 (see Fig. 6), to receive the shank 2' of each screw 2. The trough is fixed to plate 8 by means of fasteners 37. Those screws which fail to drop from the lower end of pan 30 with their shanks down in position between the plates 36 of trough 34, fall back down into the bottom of the hopper or the drum 14. A baffle 38 (see Fig. 5) connected at its upper end to a hinge 40 mounted on plate 8, prevents ejection of any screws out of the hopper by the action of the rotating drum 14. A second baffle 41 is fastened by means of screws 43 to a plate 36 of trough 34, to aid in guiding the screws into trough 34.

As the screws move down trough 34, they first pass under a knockout wheel 44 mounted on a shaft 46 journaled in spaced brackets 47 and 48 (see Figs. 2 and 5), the shaft being rotated by a pulley 50 mounted on the end of the shaft and driven by a belt 52. This structure is mounted on a rod 54 passing through brackets 47 and 48, and mounted on plates 8 and 16, the rod having a sleeve 56 positioned thereon and abutting plate 16 and bracket 48. Rod 54 has a collar 57 affixed at one end thereof adjacent bracket 48. Referring to Fig. 4a, the wheel 44 is formed with two sets of peripheral teeth 43' and a hub portion 45 of smaller diameter than the toothed portions. A space 45' is thus formed between adjacent teeth 43' on the opposite toothed portions of the wheel 44, and the outer periphery 44' of the hub portion 45, permitting the head of a screw 2 to pass through space 45' at the bottom of the wheel and down the trough past wheel 44 as it rotates. However, should a screw by accident pass down the trough on its side, that is, without being properly positioned shank down between the rails 36 of the trough, the teeth at the bottom of the wheel adjacent the trough will knock the screw off of the trough and prevent jamming.

The position or height of the knockout wheel 44 with respect to the trough 34 can be varied to accommodate different size screws 2, by adjustment of a screw 58 (see Fig. 5). Screw 58 carries a nut 59, and the lower end of the screw abuts the upper edge of plate 8 for support thereon. The end portion of screw 58 below nut 59 threadably engages the top of a support 66 integrally mounted on bracket 47. The screw 58 is connected to the end of a spring 62 which is attached at its opposite end by means of a pin 64 to plate 8, the spring overlying a support rod 65 also mounted on plate 8. Thus, manipulation of the screw 58 pivots brackets 47 and 48 about rod 54, moving knockout wheel 44 up or down with respect to trough 34.

*Escapement mechanism for moving the screws in timed successive relation down the trough*

Referring now particularly to Figs. 8 to 10a, after the screws pass beneath the knockout wheel 44, they proceed by gravity down trough 34. Near the lower end of the trough, the screws are engaged and stopped by the hooked end portion 117 of a pivoted arm 106, which is moved across the top of the trough to the center thereof to make contact with the head of the screws, as indicated in Fig. 9. Arm 106 constitutes a part of an escapement mechanism indicated generally by the numeral 71, said arm in its aforementioned position preventing further downward movement of the line of screws 2 in the trough above the hooked end 117 of the arm, as seen particularly in Fig. 9. It will be noted that a flat bar 69 (see also Fig. 6) is positioned a short distance above that portion of the guide or trough 34 below knockout wheel 44 and in longitudinal relation therewith, the bar 69 being located just above and in alignment with the central longitudinal space 69' between plates 36 of the trough, to prevent the screws passing down the trough from being ejected upward out of the trough due to vibration of the machine or from tumbling down the inclined trough over the other screws thereon. Bar 69 is connected to plate 8 by means of bolts 73 (see Fig. 6).

The escapement mechanism 71 includes a rod 68 having a spear shaped inner end 67. Rod 68 is slidably positioned in a sleeve 70, the outer end of the rod being received in an aperture 72 of an end member 74, for guiding the rod. A spring 76 is disposed in a longitudinal pocket 78 within sleeve 70, the spring abutting a collar 80 fixed on rod 68, and the inner end of end member 74, normally urging rod 68 outwardly, such outward movement being limited by collar 80, which abuts the inner end 77 of sleeve 70. End member 74 has external threads 82 engaging mating internal threads 84 in the bore 78 at the end of sleeve 70, sleeve 70 being slidably received within an outer sleeve 86 fixedly connected to frame member 15 by means of screws (not shown).

Sleeve 70 carries a bracket 90 at the forward end thereof, said bracket extending upwardly and fixedly supporting a rod 92 disposed parallel to and directly above rod 68, the forward end of rod 92 extending beyond the speared end 67 of rod 68, as clearly seen in Figs. 9 and 10. Rod 92 is disposed directly above rod 68. Bracket 90 also carries a screw 94 to which is connected one end of a spring 96, the other end of which is connected to a post 98 fixed to the adjacent end of the outer fixed sleeve 86, the spring passing through an aperture 99 in the frame member 15. A screw 100 abuts the end 74 of the movable inner sleeve 70 for driving same in a manner described more fully below. It is seen that longitudinal movement of the inner sleeve 70 carries with it rods 68 and 92.

A bracket 102 is connected by means of bolts (not shown) to one of the plates 36 of the guide trough 34. Arm 106, having a hook 117 formed integral with the outer lower end of the arm, is pivoted on a pin 108 connected to the bracket 102. A hinge type spring 112 is fixed at one end 114 to bracket 110 and is wound about the hinge pin 108 on said bracket. The spring 112 passes through a slot 115 in the arm 106, and the outer end 116 of the spring is in contact with the outer edge of arm 106 and normally urges same counterclockwise into the position shown in Fig. 9, with the hooked end 117 of the arm 106 disposed a short distance below rod 68 along trough 34. As seen in Figs. 8 and 10a, the hooked end portion 117 of arm 106, and the speared end 67 of rod 68 are disposed for movement just over the trough 34, so that they will contact the head of a screw when moved into position directly above the trough, in alignment with the central longitudinal space 69' between the plates 36 of the trough, as described below. It is also seen in Figs. 8 and 10a that rod 92 passes through an aperture 119 in the plate 69, and is adapted for reciprocal movement above the trough 34 to contact the arm 106 for the purpose noted below.

In operation it is seen that as the slidable sleeve 70 is urged forward by the driving screw 100, rod 68 will be displaced to the left and will assume a position as shown in Fig. 10a, with the speared end 67 over the central longitudinal space 69' of the trough and in alignment with the row of screws passing down the trough 34, thus preventing further movement of the line of screws in the trough above said rod. Just as rod 68 assumes this position, the forward end of rod 92, which moves with rod 68, will make contact with arm 106, causing it to rotate about pin 108 in a clockwise direction as seen in Figs. 8, 9 and 10a. This urges the hook portion 117 of arm 106 away from the trough 34 to the position shown in Fig. 10a, permitting the last screw 2" previously disposed in the trough just above hooked portion 117 of the arm 106, to drop down to the lower end of the trough, while the other screws in the trough above rod 68 are restrained from movement by spear 67 of rod 68.

When the drive screw 100 is withdrawn to the right, viewing Figs. 8 to 10a, spring 96 will urge sleeve 70 in the same direction to follow said rod, thus retracting rods 68 and 92 to the right. This causes the next screw 2'" previously just above the end of rod 68 to drop down the trough a short distance until it contacts the hooked portion 117 of the arm 106, which has now been urged back into its normal position by spring 112 as shown in Fig. 9, as rod 92 is withdrawn from contact with arm 106. The cycle is then repeated with the drive screw 100 again urging slidable sleeve 70 forward in the manner described above to permit the next screw 2'" previously restrained from movement by the hook 117, to slide down the trough. It will be noted that the spring 76 functions as a safety device to permit a slight retraction of rod 68 should the end 67 of said rod be urged forward directly against the head of a screw momentarily instead of between the screws as shown in Fig. 10a, when the slidable sleeve 70 is being urged forward to this position, thus preventing possible injury to the device under the above conditions.

*Shuttle mechanism for charging the screws individually in timed sequence to the dial*

When a screw 2 is discharged from the escapement mechanism 71 described above, it slides down the end of the trough and onto a stationary plate 118 (see Figs. 8, 9, 11, 12, 13 and 15). In this position the head of the screw, as indicated in dotted lines in Fig. 9, is supported partially on the ends of the guide rails 36 of the trough and partially by the stationary plate 118, the shank of the screw depending below plate 118.

Plate 118 is supported by means of fasteners 119 on a U-shaped bracket 121 in turn connected by fasteners 119a to an elongated guide support 118a having an integral bracket 142 connected by bolts 140 to plate 15. Guide support 118a has a longitudinally extending recess 120 in one face thereof, which communicates with a longitudinal recess 120a in the opposite face of guide plate 118a, recess 120 being deeper and wider than recess 120a, and forming shoulders 124 between said recesses within guide plate 118a. In recesses 120 and 120a is positioned for slidable movement a slider 122, held in slidable position between the legs 126 of the U-shaped bracket 121 and the shoulders 124 in guide plate 118a, legs 126 and shoulders 124 serving as guides for slider 122. Slider 122 is connected to a shuttle plate 128 by means of a screw 130 which engages a longitudinal tongue 132 integral with the shuttle plate 128, said tongue fitting in a recess 134 of slider 122. The head 136 of screw 130 is disposed in the longitudinal recess 138 between the legs 126 of the U-shaped bracket 121. Shuttle plate 128 rides on the inner surface 140 of the fixed guide support 118a. Hence it will be seen that slider 122, screw 130 and shuttle plate 128 are slidable as a unit with respect to guide support member 118a, plate 118 and bracket 121. A longitudinal slot 143 is provided in slider 122 (see Fig. 8) for longitudinal adjustment of screw 130 and the shuttle plate 128 with respect to the slider.

Viewing particularly Figs. 8, 9, 11 and 16, there is shown an arm 144 pivoted intermediate its ends on a pin 146 positioned on a bracket 148 connected to the frame member 15 by means of bolts (not shown). The lower end of arm 144 is received in a recess 148' at the end of slider 122, and has a curved contour indicated at 150 which fits into said recess 148 for driving the slider 122, the opposite end of the arm having attached thereto a rotatable cam follower 152 journaled on a pin 154 positioned axially into the end of the arm. The cam follower makes contact with a cam 32 mounted on a rotatable cam jack shaft 264. Connected to a frame member 156 of the machine (see particularly Fig. 11) is a housing 158 having positioned therein a plunger 160 mounted on a rod 164, the plunger being urged forward by a spring 162 disposed within the housing and about the rod 164 of the plunger. The plunger 160 is received in a mating recess 166 near the inner end of arm 144, and it will be seen that the plunger 160 tends to rotate the arm 144 clockwise about its pivot 146, as seen in Fig. 11, to maintain the cam follower 152 in contact with the cam 32 at all times, and also provides the driving force for moving the slider 122 and transfer plate 128 forward in the manner described more fully below. Arm 144 has a lateral extension 168 thereon (see Figs. 8 and 16) near the lower end of said arm. On the lateral extension 168 is mounted the screw 100 which drives the slidable sleeve 70 (see Fig. 9) for operating the above described escapement mechanism 71. At the end of slider 122 is an integral bracket 169 carrying an adjustable stop screw 170 adapted to abut bracket 142 to limit forward longitudinal movement of the slider 122 and also rods 68 and 92 of the escapement mechanism 71.

When a screw has proceeded to the position shown in dotted lines in Fig. 9, with the head thereof supported on plate 118 adjacent the lower end of the trough 34, the cam follower 152 at the end of arm 144 rides onto a low portion 32a of cam 32, causing the plunger 160 to rotate arm 144 clockwise about pivot 146, to urge the lower end of arm 144 to the left as viewed in Figs. 8 and 11. This causes the slider 122 to move forward, i. e. to the left as shown in Figs. 8 and 11, carrying the shuttle plate 128 therewith. The inner end 128' of plate 128 (see particularly Figs. 9 and 13) makes contact with the shank of the screw and urges it forward in position into a chuck 178 mounted to receive the screw, as seen in dotted lines in Fig. 13 and in full lines in Fig. 11, the chuck being located in a rotatable dial 174, described more fully below. When the screw has been positioned in the chuck 178, the cam follower 152 rides onto the high portion 32b of cam 32, causing arm 144 to rotate counterclockwise about pivot 146, as viewed in Figs. 8 and 11, to retract the slider 122 and the shuttle plate 128 carried thereby.

It will be observed that movement of arm 144 actuates the drive screw 100 of the escapement mechanism simultaneously with actuation of the slider 122. Hence these mechanisms operate in synchronism so that as the slider and shuttle plate 128 move forward to urge a screw into a chuck 178 of the dial, rods 68 and 92 of the escapement mechanism 71 move forward to release another screw which then slides down the trough 34 to the dotted line position shown in Fig. 9 in front of the shuttle plate, when the slider 122 and said shuttle plate have again been retracted to the position shown in Figs. 8, 9, 11 and 12.

*The structure of the dial and the gripper members thereon*

Referring particularly to Figs. 1, 17 and 45, the dial, indicated generally by the numeral 174, is in the form of a disc having an outer peripheral flange 175 in which are cut 10 spaced notches 176, at equal intervals about the peripheral flange 175, each notch being located 36° away from the adjacent notch. In each of notches 176, referring also to Figs. 18 to 28, is located the aforementioned chuck 178 which is fixed in said notches by means of a screw 180. The chuck has a recess 182 therein and at the top of said recess is a lug 184, a lower side portion 186 of the chuck being cut away at 188. It will be noted that the screw 2 which is to be drilled, when inserted into the chuck 178, is supported therein by contact of the lower surface of the head of the screw with the upper surface 189 of the chuck and with the lug 184, the shank of the screw extending downwardly into the chuck recess 182. It is noted, as seen particularly in Figs. 17 and 22, that the upper surface 189 of each chuck 178 extends somewhat above the outer periphery of the dial so that the head of a screw positioned in each chuck protrudes beyond the periphery of the dial to permit drills positioned on opposite sides of the dial to enter the head of the screw as described more fully below. Further, it will be noted that the chucks 178 can accommodate screws of different lengths since the shank of the screw, as indicated in Fig. 22, can hang below the lower end of the chuck recess 182 and within the inner periphery 191 of flange 175 adjacent the inner face 193 of the dial. Directly below and spaced from the bottom of each of the notches 176 in the dial is a slot 190 passing completely through the disc from one face thereof to the other.

A series of slots 195 (see Fig. 19) having about the same depth as the notches 176, are cut into the outer periphery of the dial, each of slots 195 extending from the opposite face 197 of the dial and communicating with a notch 176 in the flange 175. Positioned for pivotal movement in each of the slots 195 in the dial 174 is a gripper member 192 which is pivoted on a screw 196 passing radially into the dial and extending through the slot 190 below each of the notches 176. The gripper 192 is in the shape of a fork having an upper member 200, constituting the gripper arm, the outer end of which is shaped to form a hook 202. Member 200 carries an intermediate lateral extension 201 having a bore 203 formed therein. The lower fork member 206 is shorter than the upper member 200, and is in the form of a bifurcated lug having a bore 208 therein, in alignment with an of equal diameter to the bore 203 in the upper fork member 200. Screw 196 passes through bores 203 and 208 formed in the gripper member, and bore 176' of the dial, and it will be seen that the bifurcated lug 206 of the gripper is disposed in the slot 190, while the upper gripper arm 200 of each gripper is positioned for limited angular motion about screw 196, in a peripheral slot 195 adjacent the chuck 178.

It is noted that the gripper arm 200 is disposed in slot 195 below the outer periphery of the dial as seen particularly in Figs. 22 and 23. The hook 202 of each gripper 192 passes through the cut-away portion 188 of the adjacent chuck and beneath the lug 184 thereon, for gripping the shank of a screw positioned in the chuck as described above. The screw 196 has a reduced portion 198 and the gripper 192 is locked onto the screw 196 to prevent longitudinal movement of the gripper along the screw, by means of a snap ring 199, which can be snapped around said reduced portion of the screw, when said reduced portion has been aligned with the slot 201' in the bifurcated lug 206 of the gripper 192, the snap ring 199 abutting the adjacent inner surfaces of the upper and lower portions 206' of lug 206 for locking engagement with the screw. It will be noted that this structure provides limited vertical adjustment of the gripper 192 on the pivot screw 176, to raise or lower the gripping hook 202 of the gripper in slot 195, thus providing adjustment of the hook 202, for engagement with screws of varying sizes disposed in the chucks 178.

There is also provided a plurality of locking screws 205 (see Fig. 26) each passing through a pair of sleeves 207 and 209, both sleeves positioned in an aperture 213 in the dial, and located closely adjacent each of the large pivot screws 176. Sleeve 209 is threaded at 211 to receive the threaded end of screw 205, and sleeve 207 is formed with a recess 215 to receive the head of the screw 205, the sleeves 207 and 209 being slidable in aperture 213. Sleeves 207 and 209 each have an adjacent arcuate surface 217 mating with the unthreaded surface of the adjacent screw 196. Thus, when screw 205 is tightened, surfaces 217 of the sleeves 207 and 209 act as jaws making tight frictional engagement with the shank of screw 196 and preventing rotation thereof.

The outer end 230 of each of the grippers 192 (see Fig. 18) is provided with a recess 210 which receives the ball end 219 of a plunger 212. The plunger is mounted on a rod 214 which moves longitudinally in a guide 216 carrying a lug 218 mating in a recess 220 in the side of a post 222 fixed to the rear face 197 of the dial 174, near the outer periphery thereof. The rod 214 and the plunger 212 thereon are urged in a direction to rotate the gripper 192 clockwise about its pivot screw 196, by means of a spring 224 positioned about guide 216. Thus, when plunger 212 is permitted to so rotate the gripper 192, the hook 202 of the gripper will move into contact with the shank of a screw 2 positioned in the chuck 178, as seen in Fig. 20, with sufficient force to hold the shank of the screw in fixed position and prevent rotation thereof.

*Rod for actuating the gripper members and the actuating mechanism for said rod*

Viewing Figs. 1, 7, 28a and 28c to 28f, a rod 226 actuates each of the gripper members 192. The rod 226 extends through bearing plates 18 and 232 (note particularly Fig. 28a), and is held in position at its opposite end in an inclined slot 234 formed in an end member 236 of the machine. Plate 232 is provided with a curved bearing surface 230' for receiving rod 226 and permitting rocking motion of rod 226 about said curved surface. Rod 226 has a flat portion 231 which is received in an inclined slot 233 (see also Fig. 51) in plate 18, which slot is substantially parallel to slot 234. It will be seen that slot 234 which receives one end of rod 226 and slot 233 receiving the opposite inner end 228 of said rod permit rocking motion of the ends of rod 226 about the curved bearing surface 230'. A spring 238 (see Fig. 28a) is disposed about rod 226 and between bearing plate 232 and a collar 240 affixed to rod 226, and normally urges the rod to the right as shown in Figs. 1, 7 and 28a. At the outer end of rod 226 is affixed a collar 237 acting as a stop to limit longitudinal motion of rod 226 toward the right as viewed in Figs. 1, 7 and 28a.

Referring now particularly to Fig. 28c, the outer end of rod 226 is positioned in the crotch 239 of a forked lever 241, and a spring 243 (see also Fig. 28f) is disposed about the outer end of rod 226, the spring being connected by means of a pin 247 to one fork 249 of said lever. Hence spring 243 functions to maintain the rod 226 in engagement with the fork 249. Lever 241 is pivoted at its lower end on a pin 251, and a turnbuckle 253 has one end thereof in pivotal engagement at 255 with lever 241, the other end of the turnbuckle being mounted on a pivot pin 257 connected to one end of a link 259. The opposite end of link 259 has a cam roller 263 mounted thereon, the cam roller making contact with a three-position cam 265 mounted on a shaft 267 journaled in bearings 275 (see also Fig. 61), which are bolted to brackets 275' positioned on the machine platform 275a. The link 259 is pivoted intermediate its ends on the pivot pin 269 mounted on a bracket 271 connected by means of screws 273 to the machine end member 236. A spring 277 is mounted at one end in a lug 279 positioned on the upper inner end of forked lever 241, the opposite end of spring 277 being mounted on a pin 281 positioned on a bracket 283 bolted at 285 to the frame end member 236.

It will be seen that in the position shown in Fig. 28c, with the cam roller 263 on the highest lobe 265a of cam 265, the forked lever 241 has been pivoted in a counterclockwise direction about pivot pin 251, viewing Fig. 28c, with the rod 226 now positioned in the lower end of the inclined slot 234 of end member 236. In this position the inner end 228 of rod 226 is rocked out of contact with the end 230 of gripper 192, as seen particularly in Fig. 18. On continued rotation of cam 265 counterclockwise as seen in Fig. 28c, the cam follower 263 rides onto the lowest lobe 289 of cam 265, the action of spring 277 causing the forked lever 241 to rotate in a clockwise direction about pivot 251, moving the outer end of rod 226 along slot 234 to the upper end thereof, thus causing the rod to rock clockwise as seen in Fig. 28a, to bring end 228 of rod 226 into contact with the end 230 of gripper 192. This action of rod 226 pivots the adjacent gripper 192 on the dial 174 counterclockwise as seen in Figs. 18 and 28a to a position where the hook 202 of the gripper is completely out of contact with a screw 2, as seen in Fig. 18.

Then the cam follower 263 rides onto an intermediate lobe portion 287 of cam 265, and fork lever 241 is again rotated counterclockwise against the action of spring 277, as seen in Fig. 28c, a distance to move the outer end of rod 226 part way downward along slot 234, thus rocking the inner end 228 of rod 226 counterclockwise away from the end 230 of gripper 192 to the position thereof shown in Fig. 19. This causes pivotal movement of gripper 192 clockwise from its position shown in Fig. 18 to that shown in Fig. 19, the inner end 228 of the rod 226 remaining in contact with the end 230 of gripper 192, and the gripper now being almost in its normal position for holding a screw in position in the chuck 178 of the dial 174, as indicated in Fig. 20. On continued rotation of the cam 265 so that the cam roller 263 again is on the high lobe 265a of the cam, as shown in Fig. 28c, forked lever 241 will rotate further counterclockwise about pivot 251 against the action of spring 277, thus moving the outer end of rod 226 again to its lowermost position in slot 234 as seen in Fig. 28c, and rocking arm 226 further counterclockwise as seen in Fig. 28a, completely out of contact with the gripper 192, to permit said gripper to pivot clockwise to its full extent, as shown particularly in Fig. 20.

Just before the screw is urged by the shuttle plate 128 into position in the chuck 178 at the screw feeding or loading station of the dial 174, the inner end 228 of rod 226 is moved or rocked in a direction shown by arrow 227 in Fig. 18, by movement of the outer end of rod 226 from the lower end of the inclined slot 234 to the upper end thereof in the manner described above, to make contact with the arm 230 of the gripper 192, forcing the same to pivot in a counterclockwise direction about pivot screw 196 and against the action of spring 224, to the position shown in Fig. 18, with the hook 202 of the gripper retracted sufficiently out of the chuck recess 182 to permit the screw to be introduced into the chuck 178 by the shuttle plate 128, as described above, without interference from said hook. Rod 226 is then moved or rocked away from the end 230 of gripper 192, to a limited extent, by movement of the outer end of rod 226 from the upper end of the inclined slot 234 to an intermediate position therein as the cam roller 263 rides onto the intermediate lobe 287 of cam 265, causing the gripper to rotate a limited amount clockwise about pivot 196 sufficiently so that the hook 202 of the gripper makes frictional contact with the shank of the screw, but with only sufficient force to hold the screw in position in the chuck 178, as seen in Fig. 19, while permitting rotation thereof by the screw driver means described hereinafter.

Referring now to Figs. 28a, 28d and 28e, there is provided on arm 226 a second collar 242 disposed on the opposite side of bearing plate 232 from collar 240. A plate 244 has an arcuate recess 246 at one end thereof for receiving the rod 226, the plate 244 being forced into contact with the collar 242 by spring 238, whereby on movement of plate 244 to the left as seen in Fig. 28a, rod 226 will be urged in the same direction against the action of spring 238, so as to permit movement of the inner end 228 of rod 226 longitudinally away from the end 230 of the adjacent gripper 192 on the dial, as shown by arrow 245 in Fig. 18. The plate 244 has a yoke 248 connected to the center of the plate, said yoke carrying a transverse pin 252 to hold the end of a rocking arm 254 in position in the yoke. Rocking arm 254 is pivoted on a pin 256 passing through a bracket 258 bolted to the plate 232. The upper portion of rocking arm 254 has a cam follower 260 positioned thereon, said cam follower being urged into engagement with the surface of a cam 262, mounted on the cam jack shaft 264, which is pournaled in frame members 15, 18, 232, and in end member 229 (see Figs. 28a and 33). The cam follower 260 is maintained in contact with the cam by the action of spring 238 (see Fig. 28a) which tends to cause the rocking arm 254 to rock about pivot 256 in a counterclockwise direction. When the cam follower 260 rides onto the high portion of the cam 262, rod 226 is urged to the left as seen in Figs. 28a and 28e, for a purpose noted hereinafter, and when the cam follower rides onto the low portion of cam 262, rod 226 is urged to the right as seen in Fig. 28a and Fig. 28e, by the action of spring 238.

*The screw driver and actuating mechanism for orienting the screws*

Referring now to Figs. 6, and 29 to 33, on the cam jack 264 is mounted a collar 270 which is fixed for rotation on shaft 264 by means of a key 272, said collar being slidable a limited distance longitudinally along shaft 264 through slidable movement of key 272 in a keyway 273 on said shaft. A set screw 273' maintains the collar in an adjusted position on shaft 264. A beveled gear 274 is positioned for free rotation about a hub 276 integrally connected to collar 270. Positioned about hub 276 between collar 270 and gear 274 is a friction clutch 277 composed of a plate 278 and a fiber disc 280 in contact therewith, the fiber disc being urged into frictional engagement with the adjacent face of gear 274, by four pistons 282 which are urged into four equally spaced recesses 284 positioned about the rear face of plate 278, by springs 286 disposed in four equally spaced pockets 288 in collar 270, said pockets being aligned with said recesses 284. A nut 290 threadably engages the end of hub 276 of collar 270 for maintaining gear 274 in position in the hub. It will accordingly be seen that gear 274 can be held in fixed position while shaft 264 is rotating, by slippage of the disc 280 over the adjacent face of gear 274.

Gear 274 meshes with a smaller gear 292 fixed to the upper end of a post 294 carrying at its lower end a screw driver 296, the axis of gear 292 and post 294 being normal to the axis of shaft 264 and gear 274. The post 294 passes through an upper arm 302 of a bracket 303, and is slidably movable with respect to said bracket arm. Post 294 has a collar 306 positioned at the lower end thereof, a spring 308 being disposed between collar 306 and a boss 310 positioned on the lower surface of bracket arm 302 about the aperture 312 therein which receives the post 294. Collar 306 has a lug 314 connected to the lower end thereof for a purpose noted hereinafter. To the lower end of post 294 is axially connected a spindle 316 carrying at its lower end the screw driver 296, spindle 316 being slidably received in an aperture 318 in a lower bracket arm 320 connected to the bracket 303. Bracket 303 is positioned against spacers 305 mounted on the frame member 18, the spacers and bracket 303 being connected to frame member 18 by screws 307. A longitudinal slot 298 is centrally positioned in the upper end of post 294, which slot receives a key 300 fixed to gear 292. Hence it is seen that post 294 and the screw driver 296 carried at the lower end thereof are movable in a vertical direction upward and downward for a limited distance.

The spring 308 normally urges the collar 306, post 294 and screw driver 296 in a downward direction as shown in Figs. 29 and 30. It is noted, as seen more clearly in Figs. 6 and 45, that the lower end of the screw driver 296 is positioned closely adjacent the periphery of the dial 174 and that the axis of the screw driver is on a line passing through the center of the dial plate and in the central plane thereof. Also, it will be observed that the screw driver is positioned directly above the station on the dial at which a screw is fed from the trough 34 to the dial by the shuttle plate 128, as illustrated in Figs. 8 and 12, and described above.

Figure 33:
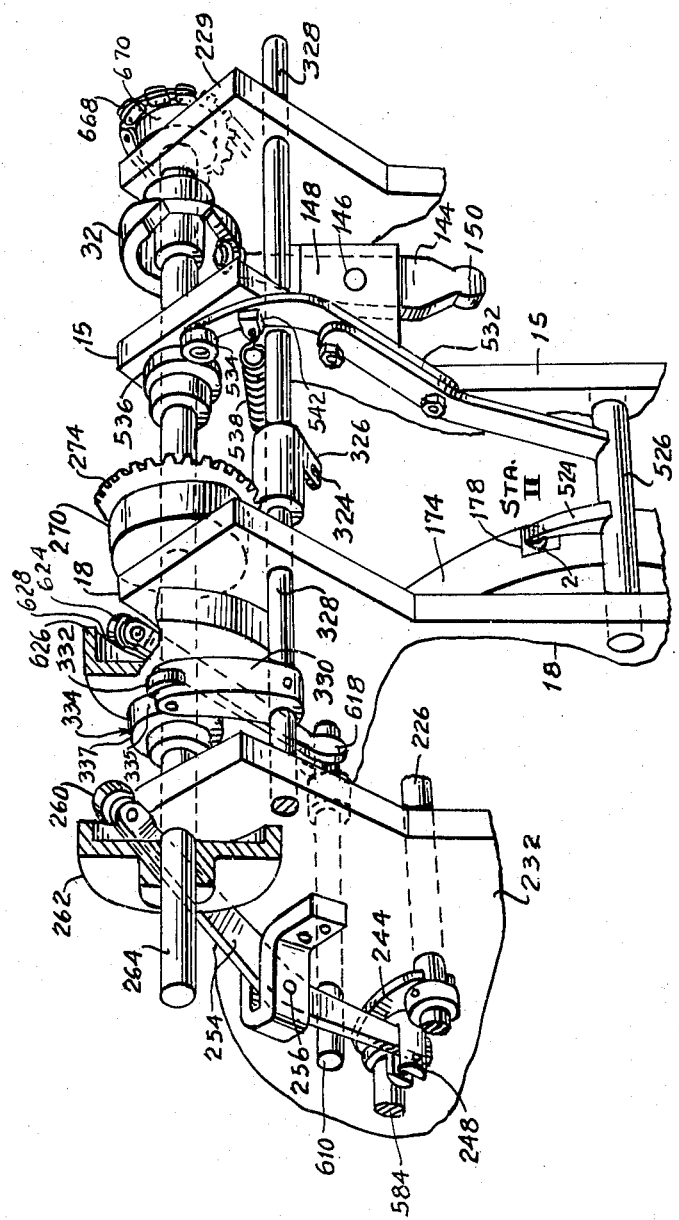
Fig. 33 is a perspective view of the cam jack shaft and related parts of the machine looking in the direction of arrow 33 in Fig. 1.

The upper end of post 294 has a reduced portion 322 in which is disposed a fork 324 connected to one end of a rocker arm 326 fixed to a rocking shaft 328 (see also Fig. 33) journaled in frame members 15, 18 and 232, and in end member 229. Referring particularly to Fig. 33, rocking shaft 328 has connected thereto an arm 330 having a cam roller 332 mounted at its upper end, the cam roller making contact with a cam 334 on the cam jack shaft 264. When the cam roller 332 rides on the low portion 335 of cam 334, as seen in Fig. 33, the rocking arm 326 is in the position shown in Fig. 29, with the post 294 and the screw driver 296 carried thereby in the lowermost position. When the cam roller 332 rides onto the high portion 337 of cam 334, arm 330 will pivot, causing rocking shaft 328 to rock in a counterclockwise direction as seen in Fig. 29, thus pivoting arm 326 in the same direction to move post 294 and screw driver 296 upwardly away from a screw 2, against the action of spring 308.

Referring particularly to Figs. 29 and 32, positioned on bracket 320 adjacent the collar 306 and lug 314 carried thereon, is a fixed stop 336 connected to plate 320 by a fastener 338, the stop 336 having a dog 340 formed on the outer periphery of the stop and positioned closely adjacent the periphery of collar 306. As shown in Figs. 29 and 30, when the screw driver 296 is in its lowered position in contact with the head of a screw 2, lug 314 of collar 306 is in substantial alignment with the dog 340 on the fixed stop 336, so that rotation of the screw driver and collar 306 will cause lug 314 to strike dog 340 of stop 336.

When a screw is first fed into position in the dial plate 194 by shuttle plate 128, as illustrated in Figs. 8 and 12, the slot 2a in the head of the screw may be oriented in almost any position, e. g. as illustrated in full lines in Fig. 32a, and is usually not in the desired position indicated by the dotted lines in Fig. 32a. The function of the screw driver is to rotate the screws so that the slots 2a in the heads thereof will be aligned in a direction perpendicular to the axis of the dial 174 as illustrated in Fig. 7, and as shown in dotted lines in Fig. 32a. The reason for this is that it is desired to bore the hole in the head of the screw in a direction perpendicular to slot 2a, and since the drills are positioned on opposite sides of the dial parallel to the axis of the dial, as will be seen more clearly hereinafter, the aforementioned orientation of the screw slot is necessary for this purpose.

Thus, when a screw 2 has been received in a chuck 178 of the dial 174 and the adjacent gripper 192 has been manipulated by means of rocking rod 226 in the manner described above so that the hook 202 thereof makes frictional contact with the shank of the screw to a degree permitting rotation thereof while holding the screw in position in the chuck, as seen in Fig. 19, rocker arm 326 on the rocker shaft 328 (see Fig. 29) is pivoted clockwise to its position shown in Fig. 29, lowering the post 294 and the screw driver 296 carried thereby until the end of the screw driver contacts the top of the screw 2 held in position for rotation thereof as described above, by the gripper 192. The spring 308 maintains the end of the screw driver in contact with the head of the screw while the post 294 and the screw driver 296 are rotating. Since the screw driver is being rotated by gears 292 and 274, and the latter gear is in constant rotation on the cam jack shaft 264, screw driver 296 will normally be in continuous rotation.

It will be noted further that the gears 274 and 292 are designed so that the gear ratio of the large gear 274 to the smaller gear 292 is about 2.1. Thus, as illustrated in Fig. 32, assuming, when the screw driver 296 is lowered into contact with the head of the screw 2, that the end of the screw driver is not in alignment with the slot 2a in the head of the screw, it will first be necessary for the screw driver to rotate sufficiently to seek the slot in the screw head and then to rotate the screw so that the slot will be in proper alignment as described above. When the screw driver is lowered and makes contact with the head of the screw, the lug 314 on the collar 306 will be in the dotted line position shown in Fig. 32, about 36° behind the dog 340 of the stop 336. The screw driver then rotates clockwise over the head of the screw as shown by the arrow in Fig. 32 until the screw driver drops into the slot in the head of the screw. Since it only requires 180° of rotation of the screw driver to seek and then register with the slot in the screw head, regardless of the original position of the slot, and since there is approximately 0.9 of a revolution, or about 324° of rotation, of the screw driver from the time it contacts the screw head indicated by the dotted line position of lug 314, until the latter strikes the dog 340, the screw driver will have ample opportunity to drop into the slot of the screw head before the lug 314 strikes dog 340. After the screw driver drops into the slot in the screw head the screw driver then continues to rotate until the lug 314 strikes the dog 340 on the stop 336 as indicated in full lines in Fig. 32, at which time the screw has been positioned with its slot 2a in proper alignment as shown in the dotted lines in Figs. 32 and 32a.

A period of interrupted motion of gears 292 and 274 and of the screw driver will then ensue while the shaft 264 completes a full revolution which commenced when the screw driver was raised from contact with the head of the previous screw following orientation thereof. This period of lost motion is provided by the clutch 277 between collar 270 and gear 274, which clutch begins slipping when the lug 314 strikes the dog 340 on stop 336, and continues to slip for a short period while the lug 314 continues to remain in contact with dog 340 and during lifting of the screw driver. This period of slippage of clutch 277 is approximately equal to the period the gear 292 would ordinarily be caused to rotate about 36°, or about one-tenth, of a revolution, by shaft 264. When shaft 264 has completed its full revolution mentioned above, arm 326 will pivot counterclockwise as viewed in Fig. 29 to raise the screw driver out of contact with the head of the screw. The clutch 277 then stops slipping and gear 292 rotates about 1.1 revolutions so as to rotate the screw driver and the lug 314 from its full line position shown in Fig. 32, one complete revolution and about one-tenth of a revolution beyond to its dotted line position shown in Fig. 32. During this period, lug 314 passes over dog 340 since the screw driver is in raised position and lug 314 is now out of alignment with dog 340, as illustrated by the dotted line position of lug 314 in Fig. 29. At the end of this period, arm 326 is pivoted clockwise as seen in Fig. 29, to again lower the screw driver into contact with the head of screw, with lug 314 again in the dotted line position shown in Fig. 32. It is thus seen that the screw driver is motionless for a period during which it would ordinarily rotate about 0.1 revolution, due to contact of lug 314 with dog 340 and subsequent slippage of clutch 277. Hence the screw driver actually rotates only two revolutions per revolution of shaft 264 (i. e. 0.9 revolutions in contact with the screw and 1.1 revolutions in raised position out of contact with the screw head), instead of the full 2.1 revolutions permitted by the 2.1 gear ratio of gears 274 and 292. As a result, the screw driver when lowered will always contact the head of the screw in a position corresponding to the dotted line position of lug 314 in Fig. 32, and hence will never be lowered in a position where lug 314 drops directly onto the top of dog 340 of the stop 336.

It will be understood of course that if desired, the slot in the heads of the screws can be oriented, by proper adjustment of the screw driver mechanism, to any desired position other than at right angles to the axis of the dial and of the drills described below.

When the screw driver 296 is retracted from the head of the screw following alignment of the slot in the head thereof as described above, the cam follower 263, as seen in Fig. 28c, moves to the highest lobe 265a of cam 265, and rocking the inner end 228 of the rod 226 completely out of contact with the end 230 of the adjacent gripper 192, as indicated in Fig. 20, causing the gripper to pivot the hook 202 thereof so as to tightly engage the shank of the screw and prevent the screw from rotating. The screw is now ready to be moved by means of the dial to the first drilling position.

*Mechanism for rotating the dial*

The dial plate or disc 174 is now actuated to transfer the screw 2 from its initial position at which it is fed into the dial plate and the head of the screw properly oriented therein, as described above, to the first drilling position. For this purpose the dial, which is mounted on a shaft 364, as seen most clearly in Figs. 1 and 7, is rotated approximately 36° by means of a dial actuating mechanism. The dial shaft 364 on which the dial plate 174 is mounted, is journaled at one end in a tapered roller bearing 345 in end plate 236, the end of the shaft carrying a locking screw 347 held securely by a plate 343 abutting said lock nut, and a screw 341 passing through said plate into the end of the dial shaft. The opposite end of the shaft 364 on which the dial 174 is mounted, is journaled in a tapered roller bearing 351 mounted in a cap 353 connected to plate 18 by means of bolts 349. The end of cap 353 carries a flange 357 on which is mounted a flexible neoprene ring 353' clamped against the flange by a steel plate 355' connected to the flange by screws 357'. The inner end of dial shaft 364 carries an integral disc 359 to which the dial plate 174 is connected by means of screws 361'. It will be noted that the inside diameter of the neoprene ring 353' is somewhat smaller than the outside diameter of the disc 359 so that the inner periphery of said ring engages the outer periphery of said disc during rotation thereof by the dial shaft, and said ring thus functions as a seal to prevent chips from the drilling operation entering the space 359' and lodging in the bearing 351. The dial shaft 364 is rotatably mounted within a sleeve 361, the outer end of which is threadably engaged by a nut 363 carried at one end of a second sleeve 365 through which the shaft 364 also passes. The nut 363 is screwed into tight engagement with the frame member 232.

The dial actuating mechanism includes an index plate 342 having ten equally spaced holes 344 therein, (see also Figs. 34 to 38). The plate 342 is fixed to the dial shaft and rotatable therewith by provision of a third sleeve 370 about the outer end of the dial shaft, on which sleeve the index plate 342 is integrally mounted. Said sleeve 370 is keyed at 372 to the dial shaft 364. Hence sleeves 361 and 365 remain fixed with respect to shaft 364 while sleeve 370 rotates with said shaft. Reciprocally mounted about the dial shaft 364 is a mating plate 346 containing ten equally spaced pins 348 aligned with the holes 344 in the index plate 342 and positioned for slidable mating engagement with said holes. Plate 346 is mounted on a hub 350 having a spaced collar 352 thereon. The hub is mounted about the third sleeve 370 and is free to move axially or rotatably thereon. The mating plate 346 is spring loaded in a direction to move plate 346 toward the index plate 342, by a spring 354 disposed between the collar 352 and a plate 356 which is clamped on the outer end of sleeve 370 and which abuts the bearing 345.

In a collar 360 which is integrally formed on one end of sleeve 370 and spaced from index plate 342, are positioned three spaced apart pins 362 (see Fig. 38), said pins being slidable in apertures 365' in collar 360 and passing through axially aligned mating holes 366 in the index plate 342. The outer ends of the pins 362 abut the inner face of the mating plate 346 and the opposite ends of pins 362 abut a collar 368 integrally mounted on one end of a sleeve 367 which is mounted about fixed sleeve 365 for free axial and rotatable movement thereon. The pins 362 are thus adapted for slidable longitudinal movement parallel to the dial shaft 364 between the collar 368 and mating plate 346, and serves as a connection between the latter two members.

The collar 352 on the freely movable or floating hub 350 has a depending arm 376, and a pin 378 is mounted on this arm and the adjacent mating plate 346. On the pin 378 is loosely mounted a block 380. Referring now particularly to Figs. 39 to 41, the block 380 is received between the arms of a yoke 382 which is fixed to a hollow rod 384 by means of a set screw 385. The hollow rod or tube has a cap 386 affixed to one end thereof by means of a pin 388, the other end of the rod being slidably received in an aperture 387 of a plate 383, and in an aperture 389 in a housing 394, for guiding longitudinal movement of said rod . Plate 383 is connected to the end frame member 236 for supporting housing 394 and a second plate 395 also connected to frame member 236 receives and supports the opposite end of rod 384 for slidable movement with respect to plate 395. Rod 384 carries a stop 397 for engaging plate 395 as pointed out more fully hereinafter.

A sleeve 391 is also slidably disposed in aperture 389 adjacent the inner end of rod 384, sleeve 391 having a flange 390 on one end thereof, which flange abuts a heavy spring 392 positioned in a pocket 393 of the housing 394. A solid rod 396 integral with a bracket 398 at one end of the rod, is threaded at 400 into the end of housing 394, and passes axially through pocket 393, the end of the rod being received in sleeve 391 and in the inner end of bore 402 of the hollow rod 384, the heavy spring 392 being disposed about rod 396. In bore 402 of the hollow rod 384 is positioned a spring 404 one end of which abuts the end of solid rod 396, the other end abutting the cap 386. It will be noted that in its normal position the flange 390 at the end of sleeve 391 is held against the shoulder 405 formed between the pocket 393 and aperture 389 of housing 394, by the heavy spring 392, as seen in Fig. 44.

In contact with the cap 386 is the end of a lever 406 which is pivoted at its lower end on a pivot 408 mounted in a block 410 positioned on platform 275a of the machine. Lever 406 has connected thereto an arm 414 on the upper end of which is mounted a cam roller 416 in contact with a cam 418 which is continuously rotated on the cam shaft 267 (see also Fig. 61). A rod 422 is connected to the arm 414 and extends longitudinally with its outer end normally in contact with a lug 424 on a switch generally indicated by the numeral 426. The switch is of conventional type and is clamped on the rod 384 by means of screws 428. Rods 384 and 422 normally move in unison by means of the lever 406 which normally remains in contact at all times with cap 386 and the cam 418, as described below. However, should the movement of rod 384 be interrupted at any time during longitudinal movement thereof in the manner more fully described below, the lever 406 will leave the cap 386 and pivot clockwise about pivot 408, carrying the rod 422 to the right as viewed in Fig. 40, moving it out of contact with the lug 424 to open switch 426 to shut off the motor and stop the machine.

When the parts are in the position shown in Fig. 44, and just prior to movement of rod 384 to the left, sleeve 367, as seen in Fig. 7, moves to the left by means described hereinafter, forcing pins 362 against the mating plate 346 and causing movement thereof to the left against the action of spring 354 to the position of plate 346 seen in Fig. 7, with the pins 348 disengaged from the holes 344 of index plate 342. Assuming counterclockwise rotation of cam 418, the cam roller 416 then rides from the low portion 437 of cam 418, to the intermediate portion 432 of the cam, moving rod 384 from its position shown in Fig. 44 to its intermediate position shown in Fig. 40. It is seen that as the cam roller 416 rides onto portion 432 of cam 418, lever 406 will cause rod 384 to first strike the adjacent end of sleeve 391, and said lever will then urge the hollow rod 384 and the abutting sleeve 391 to the left as seen in Fig. 40, against the action of the heavy spring 392. As the cam continues to rotate along a higher portion of the cam to the high point 433 thereon, rod 384 will continue to move to the left urging the sleeve 391 in the same direction against the action of the heavy spring 392. This movement of rod 384 carries with it the yoke 382 and the block 380 therein to the position shown in Fig. 43. Such motion of block 380 rotates the arm 376 (see Fig. 35) clockwise about the dial shaft 364, as seen in Figs. 35, 40, 43 and 44, causing the mating plate 346 to rotate therewith so as to cock the mating plate 346 prior to engagement thereof with the index plate 342 for rotating the latter and dial shaft 364 as described more fully below. Just as rod 384 reaches its extreme left position as shown in Fig. 43, referring again to Fig. 7, sleeve 367 is caused to move to the right, which action permits spring 354 to force the mating plate 346 and the pins 362 to the right, with the aligned pins 348 of mating plate 346 passing into the holes 344 of the index plate 342, so as to engage the mating plate with the index plate, as seen in Fig. 34.

Referring again to Fig. 43, when the cam roller 416 rides from the high portion 433 of cam 418 to the low portion 437 thereof, the cam roller is maintained in contact with the cam by the action of springs 392 and 404, thus reciprocating the rollow rod 384 to the right as viewed in Fig. 43, and carrying yoke 382 and block 380 in the same direction. Such motion continues until rod 384 has reached its extreme position to the right, as seen in Fig. 44, causing the yoke 382 and block 380 to take the position shown in Fig. 44. It will be noted that movement of rod 384 to its extreme position from left to right, or vice versa, produces an approximately 36° rotation of the arm 376. Since during the movement of rod 384 from left to right, plate 346 is in driving engagement with plate 342, the latter rotates the dial 174 counterclockwise 36° (viewing the dial from the right in Fig. 7) under the driving force of springs 392 and 404. In the position of rod 384 as seen in Fig. 44, the inner end of rod 384 is separated from the adjacent end of sleeve 391, leaving a space 439 (see Fig. 44) therebetween. It will be noted that stop 397 strikes plate 395 when the rod 384 reaches its extreme position to the right as seen in Fig. 44. At this point, mating plate 346 is again disengaged from index plate 342 in the manner described above, and plate 346 moves to the position shown in Fig. 7.

It is thus seen that the spring combination 392 and 402 constitute an inertial spring driving system. Thus, for example, as the cam roller 416 proceeds from the low portion 437 of the cam 418, to the intermediate position 432 of the cam, the corresponding movement of rod 384 only acts against the light spring 404 during this period, until the rod 384 has made contact with sleeve 391. Thereafter, the rod 384 continues its movement to the left against the action of the heavy spring 392. When the end of the hollow rod 384 makes contact with sleeve 391 it commences to compress spring 392 and continues to compress said spring until the roller 416 rides into the highest lobe 433 of cam 418. On reverse motion of rod 384 the heavy spring 392 overcomes the inertia of the mass including the rod 384, arm 376, the attached sleeve 350 (see Fig. 7) mating plate 342, and other connected parts including the index plate 346, the dial shaft 364 and the dial 174, all of which are at this time connected to the mating plate 346 (see Fig. 34) as pointed out above. Said spring 392 thus causes movement of sleeve 391 and rod 384 until the flange 390 of said sleeve strikes the shoulder 405. The light spring 404 then causes further movement of rod 384 to the right with the inner end of rod 384 separating from the adjacent end of the sleeve 391, which now remains stationary. Spring 404 is sufficiently strong to cause continued movement of rod 384 and lever 406 to the extreme right as seen in Fig. 44, at which position roller 416 is on the lowermost portion 437 of cam 418.

It will be noted that during movement of rod 384 from its extreme positions to the left and to the right, as noted in Figs. 43 and 44, block 380 moves up and down. Also, block 380 moves longitudinally in yoke 382 as seen in Figs. 7 and 34, when the hub 350, carrying arm 376 and mating plate 346 is moved axially for engagement of mating plate 346 with index plate 342, and for disengagement of said plates, as described above. Such longitudinal motion of block 380 takes place when rod 384 is at its extreme left position, as shown in Fig. 43, or at its extreme right position, as shown in Fig. 44. Hence, the block 380 and yoke 382 serves as a universal type joint between the rod 384 and arm 376 of the hub 350.

*The drills and actuation thereof*

Referring particularly to Figs. 7, 34 and 37, on the longitudinally slidable sleeve 367 is a collar 435 and abutting said collar is an arcuately shaped end portion or fork 436 of a lever 438 which is pivoted at an intermediate portion on a pivot pin 440 journaled in a yoke 441, integrally connected to a bracket 442 mounted on a cylindrical plate 444 by means of screws 446, said plate being connected by arms 448 to the frame member 232. Plate 444 has an aperture 445 therein of substantially greater diameter than sleeve 367, to permit free axial movement of said sleeve with respect to plate 444. Lever 438 is pivoted at its outer end on a pivot pin 450 journaled in the upper yoke 451 of a double yoke 452. A link 453 positioned in a plane perpendicular to the plane of lever 438 (see also Fig. 6) has its upper end pivotally connected to a pivot pin 456 journaled in the lower yoke 458 of double yoke 452, the slot in yoke 458 being at right angles to the slot of yoke 451. A bell crank 454 has its upper end pivoted on a pin 455 at the lower end of link 453, the bell crank being pivoted on a pivot 460 positioned on a bracket 464 connected on the machine platform 275a. The opposite end of bell crank 454 has a cam roller 468 thereon in contact with a cam 470 which is mounted on the cam shaft 267. Cam 470 has a series of steps 472 thereon for a purpose noted hereinafter, the roller 468 riding on one of the steps 472.

Referring to Figs. 1, 6, 7 and 49 to 52, a series of drills, a pair of which are indicated generally at 476 in Figs. 1 and 7, are positioned at spaced intervals about the dial plate 174 for drilling a hole in the head of a screw 2 positioned in the dial plate and oriented as described above. Each of the drills is composed of a drill stem 479 having a drill bit 477 mounted in a chuck 481 at one end of the drill stem. The drill stem 479 is slidably positioned in a quill 478 mounted in ball bearing 480 and 482 in bearing plates 18 and 232. The drill stem is keyed to the quill 478 by means of a key 483 along the inside of the quill which mates with an elongated keyway 485 on the drill stem. The keyway is substantially longer than the key to permit longitudinal movement of the drill stem with respect to the quill. At the outer end of the drill stem is a flange 487, and a spring 489 is positioned about the drill stem between said flange 487 and the outer end of the quill, said spring normally urging the drill stem 479 and the drill bit 477 away from the work, that is, toward the left as viewed in Fig. 7. In the outer end of spindle 479 is mounted a ball 484, which forms a hard bearing surface in point contact with a lug 481 on the end of a lever 486. Quill 478 carries an integral pulley 493 which receives a driving belt 495. Lever 486 is fulcrumed at an intermediate point thereof on a fulcrum pin 488, the opposite end of lever 486 abutting a collar 490, on the inner portion of the longitudinally movable sleeve 367. Lever 486 is loosely mounted on the pin 488, and has an arcuate portion 497 which receives the pivot pin 488, and the action of the drill spring 489 maintains the lever 486 mounted on the pivot pin 488. Hence the drill stem 479, drill spring 489 and lever 486 are readily removable when desired. Fulcrum pin 488 is mounted on a block 492 positioned for longitudinal adjustment in the cylindrical plate 444, by means of an adjusting screw 496. All of the drills have the same structure as described above, including the associated lever 486 and its above described adjustment means.

As seen in Figs. 6, 45 and 53, there are ten stations on the dial plate 174 indicated by Roman numerals I through X respectively, at each of which the dial is made to remain stationary in the manner described more fully below while a particular operation is carried out on each screw, such as orienting, drillings, etc., following which the dial plate is rotated to the next station 36° away from the previous station for the succeeding operation. It will be further noted that the apertures 344 in the index plate 342, and the mating pins 348 in the plate 346 are also spaced at 36° intervals about the respective plates 342 and 346, for rotation of the dial plate 174 from station to station as described more fully below.

It will be observed that Station I on the dial plate 174 is the feeding or loading station at which the screw is fed into the dial plate as shown in Figs. 8 and 12, and the orienting of the screw to position the slot thereof in proper alignment as described above, also takes place at Station I. It will be seen from Figs. 7, 45 and 53 that Station I is at a point along the periphery of the dial just below, i. e. 36° away, from the top of the dial. The first set of drills (see Figs. 6 and 49 to 52), designate by numeral 476a and each having the same structure as drills 476 described above, is located at Station II, 36° counterclockwise away from Station I, as seen in Figs. 6, 51 and 53. It will be noted that the set of drills 476 shown in Figs. 1 and 7 are actually located at Station V.

To rotate the dial 36° so as to move the screw in the dial from Station I to Station II, at which drilling of the hole in the head of the screw is commenced, the drill cam 470 rotates to a position at which the cam roller 468 is on the high portion of the cam. This causes bell crank 454 to pivot clockwise as seen in Fig. 6, which in turn pivots lever 438 as seen in Figs. 7 and 34, about pivot pin 440 to permit movement of the forked end 436 of said lever away from the collar 435. At this time, referring particularly to Fig. 7, drill spring 489 causes drill lever 486 to rotate clockwise about fulcrum pin 488 to urge the movable sleeve forward in the direction of the dial 174. Movement of sleeve 367 forward toward the work tends to separate collar 368 on sleeve 367 from the abutting pins 362, and causes the spring 354 to urge the hub 350 carrying the mating plate 346 forward with the pins 348 thereof engaging in the holes 344 of the index plate 342. During this movement of plate 346 into mating engagement with the index plate 342, the pins 362 are also urged forward into engagement with the collar 368 of the slidable sleeve 367.

When the pins of the mating plate 346 are received within the holes in index plate 342, the reciprocating rod 384 is in its extreme position at the left with the cam roller 416 on the highest portion 433 of the cam 418. An instant thereafter, the cam roller 416 rides onto the lowest portion 437 of the cam, causing rod 384 to move to the extreme right by the action of springs 392 and 404, as explained above. This causes rocking arm 376 to rotate counterclockwise approximately 36° and producing a corresponding 36° rotation of the mating plate 346 and the index plate 342. Rotation of index plate 342 in turn causes rotation of the dial plate 174 36° in a counterclockwise manner as viewed in Figs. 6, 45 and 53, to move the screw 2 from the feed Station I to Station II, where drilling commences.

As previously noted, the driving force for rotating the dial 174 is furnished by springs 392 and 404 as the cam follower 416 rides from the high to the low portion of cam 418 and rod 384 moves to the right as seen in Fig. 44. If for some reason during this driving period, cam roller 416 should leave the cam 418, spring 404 will cause the rod 384 to travel beyond its normal extreme right position, carrying rod 422 out of contact with switch 426 to cut the motor and stop the machine.

The dial plate 174 has now been advanced to bring the screw into the first drilling position. It is noted that during rotation of the dial 174 in the manner described above, the drill spring 489 has held the drill spindle 479 and drill 477 in retracted position.

Referring now to Figs. 6, 45 to 48, and 61, after the dial plate 174 has been rotated 36° as described above to move the screw from Station I to Station II, a lever 500 pivoted on a pin 502 mounted on frame member 18, and having a dog 504 at one end thereof is arranged to pivot the lever counterclockwise as seen in Fig. 45 to cause the dog 504 to engage a notch 506 formed in a plate 508 connected to the rear face 197 of the dial plate, by means of screws 510.

It is noted that there are ten such plates 508 having notches 506 therein, each of said plates being spaced 36° apart and being disposed between the adjacent chucks 178 for receiving the work screws. The lever 500 functions when engaged with a notch 506 in one of the plates, to hold the dial 174 in fixed position for assuring proper alignment of the drills with the head of the screw, and to hold the dial steady while the mating plate 346 is being reset for registration with the index plate 342 to again rotate the dial.

This movement of lever 500 for engaging the dog thereof with a notch 506 is brought about by rotation of a cam roller 512 positioned at the opposite end of the lever 500, onto the low portion 513 of a cam 514 fixed to the cam shaft 267. The lever 500 is urged in a counterclockwise position by a spring 516 connected through a rod 518 and link 520 to the end of the lever 500 adjacent the cam roller 512 thereon, the spring being fixed at its opposite end on a pin 522 carried on a bracket 523 (see Fig. 6) bolted at 525 to plate 8.

Also, when the dog 504 engages a notch 506 to hold dial 174 in fixed position, as seen in Figs. 33 and 45, a lever 524 pivoted on a rock shaft 526 is actuated to rotate the lever to bring the opposite ends thereof into engagement with the head of the screw on the dial plate at Station II, to hold the screw down in the initial drilling position to assure that the screw remains fixed when drilling commences. Rock shaft 526 is mounted on frame members 15 and 18, and is actuated by a lever 532 connected at its lower end to the rock shaft. The upper end of lever 532 carries a cam roller 534 which rides on a cam 536 mounted on the cam jack shaft 264. A spring 538 is connected at one end to frame member 15, and at its other end to a bracket 542 on lever 532. When the cam roller 534 rides onto the low portion of cam 536, levers 532 and 524 will pivot clockwise as seen in Fig. 33 to bring the end of the lever 524 into contact with the head of the screw located at Station II. The spring 538 maintains the roller 534 at all times in contact with the surface of cam 536.

Referring again to Figs. 6, 7 and 34, when cam roller 468 rides onto the high portion of cam 470, bell crank 454 pivots clockwise as seen in Fig. 6, turning lever 438 clockwise about pin 440 to cause the forked end 436 of lever 438 to urge the slidable sleeve 367 away from the work. This action forces the pins 362 to the left as seen in Figs. 7 and 34, which in turn urges the mating plate 346 to the left against the action of spring 354, thus disengaging the pins 348 of plate 346 from the holes 344 in the index plate 342. At this time the rocking arm 376 (see particularly Figs. 40 to 44) commences to rotate clockwise 36° by movement of rod 384 from its extreme position at the right to its extreme left position by movement of the cam roller 416 from the low position 437 to the highest portion 433 of the cam 418. This cocks the inertial spring system 392, 404 and places arm 376 again in position to drive dial 174 another 36° when the pins of plate 346 are subsequently moved forward into engagement with the holes in index plate 342. During this period of withdrawal of plate 346 from engagement with index plate 342, and movement of rod 384 from its extreme right position shown in Fig. 44 to its extreme left position, drilling of the screw head takes place as described below.

Thus, referring again to Figs. 7 and 34, on movement of the slidable sleeve 367 to the left away from the work, which movement disengages plate 346 from plate 342 lever 486 is pivoted clockwise against the action of drill spring 489 to advance the drill stem 476 and drill 477 into engagement with the head of a screw at Station II. The amount of forward axial motion of the drill is determined by the motion of the slidable sleeve 367, which is determined in turn by the shape of the drill cam 470 and the lever ratio of lever 486. It will be noted that the series of steps 472 on the periphery of the drill cam 470 also enables adjustment of the degree of movement of the slidable sleeve 367 and hence the amount of advancement and retraction of the drills 476. For this purpose cam 470 is slidably adjustable along the shaft 267 to position one or another of the stepped peripheral portions 472 in contact with the drill cam roller 468. A set screw 470' is provided to hold the cam 470 in any desired position on shaft 267. The character of the motion of the drill 476 and therefore the amount of penetration by the drill into the head of the screw is further determined by the adjustment of pivot 488 through adjustment of set screw 496. It is noted that the pulley 493 on the quill 478 of the drill 476 is driven through belt 495 from a multiple pulley 550 mounted in bearings 552 on the sleeve 361, said multiple pulley having a series of shallow grooves 553, one of which receives said belt. Hence the drills 476 are in continuous rotation.

It is noted that multiple pulley 550 is disposed between frame members or plates 18 and 232, but is separated sufficiently from these plates to permit free rotation of said pulley. The plates are separated by means of a sleeve 555 positioned over the sleeve 361, the sleeve 555 being squeezed between bearings 552 by the nut 363.

There is positioned at Station II on the right hand side of the machine, viewing the machine as shown in Figs. 1 and 7, a second drill 476 exactly like the drill 476 described above and in alignment therewith and operated by the same mechanism as described above and shown on the left hand side of the machine except however that the longitudinal motion of the drill on the right hand side of the machine is opposite to that of the drill on the left hand side of the machine, whereby the drills can be advanced and retracted simultaneously in opposite directions. When these drills are advanced in the manner described above, each of said drills bores a hole into the head of the screw from opposite sides thereof. When the two opposite drills have advanced to their farthest position into the head of the screw, they are each retracted away from each other and from the head of the screw by drill spring 489, and the motion of the slidable sleeve 370 in response to the rotation of the drill cam 470, as described more fully below.

The common mechanism and structure for operation of the drills on the right hand side of the dial 174, as viewed in Figs. 1 and 7, are designated by corresponding part numbers employed above in describing the structure and mechanisms for operation of drill 476 described above. However, it will be noted that the right hand side of the machine does not contain any dial activating mechanism as described above.

Instead of a rotatable dial shaft such as 364, there is provided on the right hand side of the dial plate a shaft 561 held in fixed non-rotatable position in frame members 15 and 229 and end member 563. Shaft 561 is in alignment with the dial shaft 364. Shaft 561 carries sleeves exactly like sleeves 361 and 365, and bearing the same part numbers. Sleeve 365 on shaft 561 carries a freely slidable sleeve 563. Said sleeve corresponds to reciprocable sleeve 367 about the dial shaft, except that sleeve 563 only carries two collars 565 and 567, corresponding to collars 490 and 435, respectively on sleeve 367. The drill lever 486 of the drill 476 to the right of the dial 174 contacts the collar 565 of sleeve 563, and the drill cam lever 438 on the right side of the dial contacts collar 567 of sleeve 563, for controlling advancing and retracting movement of the right hand drill 476 in the same manner as described above with respect to the left hand drill 476, except that the levers and associated structure between the drill cam 470 and the drill 476 to the right of the dial are reversed from the corresponding mechanism to the left of the dial 174, described above.

After the holes have been drilled into opposite sides of the head of a screw on an axis perpendicular to the slot 2a in the head of the screw, as seen in Fig. 7, the drill cam roller 468 rides onto the low portion of drill cam 470 (see also Fig. 6), pivoting lever 438 counterclockwise about pivot pin 440 to cause the forked end 436 of lever 438 away from the abutting collar 435. The spring 489 then urges drill lever 486 to pivot clockwise about pin 488, the opposite end of lever 486 abutting collar 490 of sleeve 367, urging the sleeve forward toward the work. This causes retraction of the drill spindle 479 and drill 477 away from the work. The same action takes place on the right side of the machine as viewed in Fig. 7 to retract the opposite drill 476 from the work.

During this forward motion of sleeve 367, spring 354 urges the mating plate 346 toward the index plate 342 to cause the pins 348 to register with the holes 344, while pins 362 are advancing to the right to follow sleeve 367, thus placing plate 346 in driving position to the index plate 342 to advance the dial 174 to the next position by movement of rod 384 from left to right as seen in Figs. 43 and 44 and described above. However, just prior to rotation of the dial 174 to the next position, the lever 500 rotates clockwise, as seen in Fig. 45 to withdraw the dog 504 thereof from the mating notch 506 on the dial plate, and the lever 524 is rotated counterclockwise as seen in Fig. 45 to withdraw the end of the lever from the head of the screw, thus permitting free rotation of the dial plate 174.

Referring to Fig. 54, it is noted that at Station II, which is displaced about 72° from the top of the dial, a shallow but wide counterbore 569 is drilled into the head of the screw on opposite sides thereof, the drills being disposed perpendicularly to the slot 2a in the head of the screw 2. This is accomplished by means of a pair of drills exactly like drills 476 shown in Fig. 7, except that drills 476a are located adjacent the periphery of the dial at said Station II, and the drill bits 477a of drills 476a are about twice the diameter of the drill bits 477 of drills 476 and the other drills described below. All of the drills except the first pair of drills 476a are of the same diameter equal to the diameter of the hole to be drilled in the screw head. This is for the purpose of drilling a wide counterbore larger than the diameter of the hole to be drilled in opposite sides of the screw head to serve as a guide for the remaining drills in drilling the desired hole in the screw head. Drills 476a are actuated in the same manner as drills 476 and in synchronism therewith.

When the dial plate 174 is rotated to advance the screw 2, 36° from Station II to Station III, a second set of drills 476b like drills 476, positioned in the same manner as drills 476 on opposite sides of the dial 174 adjacent the head of the screw, are actuated in the same manner and in unison with said drills. Drills 476b enter the counterbores 561 and commence the drilling of the hole to a limited depth as illustrated in Fig. 54. These drills are then retracted and the dial advanced as described above to the next position at Station IV. Here a third set of drills 476c similar to drills 476, and positioned in the same manner on opposite sides of the dial, drill the holes in the head of screw 2 somewhat deeper than drills 476b. The dial is then advanced to present the screw at the position adjacent the fourth set of drills 476 at Station V. The fourth set of drills 476 are located adjacent the bottom of the dial. Drills 476 drill the holes in the head of screw 2 still deeper than drills 476c in Fig. 54. The dial plate 174 is then advanced to the next position to present the screw at Station VI where a fifth set of drills 476d similar to drills 476 and actuated and positioned in the same manner adjacent the dial, drill the hole almost entirely through the head of the screw, the drills meeting at the center of the head of the screw as illustrated at 571 in Fig. 54. The hole has now been completely bored through the screw except for the bur 573 at the center of the hole.

The dial plate 174 is then advanced to bring the screw to Station VII adjacent a single drill 476e (see also Figs. 49 to 52) similar to drill 476 and located adjacent the dial on the right side of the dial plate 174 as viewed in Figs. 1 and 7. This single drill probes the hole formed by the previous drills and is advanced to a position beyond the center of the screw as illustrated in Fig. 54, to remove the central bur 573. Then the dial plate 174 is advanced to present the screw at Station VIII where is located another drill 476f similar to drill 476 and positioned at the left side of the dial 174 as viewed in Fig. 1. This drill probes the hole in the head of the screw by advancing in the hole to a position therein beyond the center of the screw but from a direction opposite to the direction of the previous drill. The function of the last drill is to remove any remaining burs or roughness along the wall of the bore and to form a smooth uniform bore extending completely through the head of the screw. The dial 174 is then advanced to present the screw at Station IX where an inspection drill 476g similar to drill 476 is positioned to the right of the dial 174. This drill advances completely through the bore to insure that it has been completely and properly bored.

All of the drills are noted to be positioned circumferentially about and closely adjacent the outer periphery of the dial in proper alignment with the head of the work screw when the dial moves said screw to the respective drill positions. Each of the drills on the respective sides of the dial is parallel to the other drills on the same side of the dial, and the axis of each of the drills is parallel to the axis of dial shaft 364 and stationary shaft 561, and perpendicular to the aligned slots 2a of the work screws 2 carried by the dial to the respective drill stations.

It is noted that each of the drills 476a to 476d and 476f positioned on the left side of the dial, viewing Fig. 7, has an actuating lever like 486 of drill 476, each of said levers being radially disposed about the dial shaft 364, with their inner ends all abutting collar 490 on the sleeve 367. Also, it is noted that each of the drills 476a to 476d, 476e and inspection drill 476g positioned on the right side of the dial as seen in Fig. 7, has a lever 486a to 486d, 486e and 486g like actuating lever 486 on the right drill 476 shown in Fig. 1. As seen in Fig. 50 each of the latter levers is radially disposed about the stationary shaft 561 on the right side of the machine, the inner ends of these levers abutting collar 565 on the reciprocable sleeve 563. Hence all of the drill levers on the left side of the machine in contact with collar 490 move in unison with sleeve 367, and all of the drill levers in contact with collar 565 on the right side of the machine move in unison with sleeve 563.

It is further noted that the motion of the slidable sleeves 367 and 563 is such that the drill bits carried at the inner ends of the drill spindles are entirely clear of the work when the drills are in completely retracted position. Since all of the drills on the respective opposite sides of the dial 174 are given their longitudinal movement by the movement of sleeves 367 and 563, the total stroke of each of the drills on the respective opposite sides of the dial is the same. However, the beginning of the stroke of each drill and therefore the end of the stroke is determined by the adjustment of set screws 496 (see Fig. 7) associated with each of the drill levers 486 to 486g. Thus, as indicated in Fig. 54, it will be seen that the set screw 496 is adjusted for each of the drills 476a, 476b, 476c, 476, and 476d on the respective opposite sides of the dial, beginning with the drills 476a at Station II, so as to slightly advance the starting position of each of the successive drills at Stations III to Stations VI. In this manner, each set of successive drills at Stations III to VI function to bore the hole somewhat deeper into the head of the screw from opposite sides thereof.

*Operation of the inspection drill*

As seen in Figs. 1, 50 and 55, the outer end of drill lever 486g of the inspection drill 476g at Station IX, located 36° away from the top of the dial, has a flange 575 mounted on the upper end thereof, which carries a sleeve 577. Over sleeve 577 is positioned a cylinder 579 having integrally connected thereto a housing 560 which contains a conventional switch indicated generally by the numeral 562. A short rod 564 is axially disposed in sleeve 577, and is mounted for slidable movement in a plate 566 held in flange 575, and in a rear plate 568 connected to the rear of sleeve 577. A stop 581 is mounted on rod 564 between plates 566 and 568, the stop being normally held in abutting relation with the front plate 566 by a heavy spring 570 disposed about rod 564 between stop 581 and rear plate 568. Spring 570 is stronger than the spring 489g on the spindle of the inspection drill 476g.

The forward end 572 of rod 564 is normally held in abutting relation with a mating button 574 on the rotating drill stem 479g of drill 476g, by spring 489g, and the opposite end 583 of the rod is normally separated from an adjacent lug 576 on switch 562, the switch being closed under these conditions. When lever 486g is pivoted counterclockwise about its pivot point 488g to cause the drill stem 479g to move forward so as to insert the inspection drill into the bore of the screw head, as seen in Fig. 54, rod 564 remains stationary with respect to flange 575 and moves longitudinally with said flange and the upper end of the lever, since spring 570 is heavier than spring 489g. If, however, while the drill 476g is passing through the hole in the head of the screw as indicated in Fig. 54, the drill bit strikes an obstruction in said hole preventing further movement of the drill stem 479g to the left as seen in Fig. 55, rod 564 will also stop moving in a longitudinal direction. However, lever 486g carrying flange 575, sleeve 577 and the switch 562 will continue to move, because of the positive connection of lever 486g with the moving sleeve 563 (see Fig. 50), causing spring 570 to yield, and thus forcing the opposite end 583 of the rod into engagement with the end of lug 576 on switch 562, to open said switch and shut off the motor.

*Mechanism for release of the screw from gripped position in the dial just prior to discharge of the screw*

The rocking or driving plate 346 then registers with index plate 342 (see Figs. 7 and 34) to rotate the dial plate 174 to carry the working screw 2 from inspection Station IX to the last or discharge Station X, which is located at the top of the dial 36° away from the feeding station, as seen in Figs. 7, 45 and 53.

Referring now to Figs. 28a and 28c to 28f, together with Figs. 20 and 21, at Station X a rod 584 similar to rod 226 and connected to the same mechanism as described above for actuation of rod 226, functions by a rocking motion to actuate the gripper 192 and to rotate it counterclockwise from gripping position as shown in Fig. 20 to the position as seen in Fig. 21, thus withdrawing the gripper hook 202 from clamping engagement with the shank of the screw. It will be understood of course that throughout the rotation of the dial plate 174 from Station I, following the orientation of the screw at said station, up to and including the time that the dial moves the screw to Station X, the shank of the screw is continuously gripped by the jaw or hook 202 of gripper 192 in the manner shown in Fig. 20.

The rod 584 passes through bearing plates 18 and 232, the end of the rod then passing through horizontal slot 586 in the end member 236 (see Fig. 28c), said slot being disposed adjacent and somewhat above the inclined slot 234 receiving rod 226. As in the case of rod 226, rod 584 is pivoted on a curved bearing surface 588 (see Fig. 28a), and has a flat portion 590 near its inner end, which is received in a slot 592 (see also Fig. 51) of frame member 18. Thus, rocking motion of rod 584 is permitted so as to pivot the inner pointed end 594 of rod 584 into and out of engagement with the grippers 192. Rod 584 has a collar 596 positioned on the outer end thereof to limit longitudinal motion of said rod, and a spring 598 is positioned about rod 584 between a collar 600 connected thereto and the adjacent bearing plate 232, the spring normally urging the rod to the right as viewed in Fig. 28a. It is seen in Fig. 28c that the outer end of rod 584 is maintained in contact with the outer surface of the second fork 602 on the pivoted arm 241, by means of a spring 604 positioned about the rod 584 and fastened to the fork 602 by pin 604'.

Hence it will be seen that when the cam roller 263 rides onto the lowest lobe 289 of cam 265, lever 241 will rotate clockwise about pivot pin 251, urging rod 584 to the right as viewed in Fig. 28c, by the action of spring 277. This produces a clockwise rocking motion at the right end of rod 584 as viewed in Fig. 28a, causing the inner end 594 of rod 584 to pivot clamping lever 192 on the dial counterclockwise as seen in Figs. 28a and 21, to withdraw the jaw 202 of lever 192 away from the shank of the screw. When the roller 263 rides onto the high lobe 265a of cam 265, lever 241 will rotate counterclockwise against the action of spring 277, moving the outer end of rod 584 to its extreme left position in slot 586 as seen in Fig. 28c, and rocking the inner end of arm 584 out of contact with gripper 192. It will be noted that both rods 226 and 584 have a simultaneous rocking action imparted thereto by the movement of the lever 241 as seen in Fig. 28c. Hence, when rod 226 is actuated to retract a gripper 192 at Station I for charging a screw into the dial 174, rod 584 simultaneously retracts a gripper 192 at Station X to permit discharge of a screw from dial 174. The rocking action of rods 226 and 584 is further illustrated in Fig. 58.

It is further noted in Figs. 28d and 28e that rod 584 is carried in an arcuate notch 606 at the opposite end of plate 244 from notch 246, and the rod 584 carries a collar 608 (see Fig. 28a) which is engaged by the plate 244 through the action of spring 598. Hence it will be seen that rods 226 and 584 are moved longitudinally in synchronism by lever 254 and plate 244. Thus, just prior to movement of the dial 174 from one station to another, both the rods 226 and 584 are urged to the left as seen in Fig. 28a by the lever 254 and plate 244, so that during rotation of the dial the inner end 228 of rod 226 and the inner end 594 of rod 584 will be withdrawn beyond the outer ends 230 of the respective adjacent levers 192 (see also Fig. 20) to clear the same and permit the dial to rotate without interference from said rods. After the dial has rotated to the next station, springs 238 and 598 urge rods 226 and 584 to the right in response to movement of cam roller 260 to the low portion of cam 262 as seen in Fig. 28e. At this point rods 226 and 584 will then be rocked by the motion of lever 241 (see Fig. 28c) in the manner described above, for opening the grippers 192.

*Mechanism for ejecting the screw from the dial*

After the gripper 192 has been actuated by rod 584 to rotate the jaw 202 thereof out of engagement with the shank of a screw at Station X, referring now particularly to Figs. 1, 7 and 28b, an ejection rod 610 is reciprocated to cause a pointer 612 at the forward end thereof to strike the head of the screw and eject it from the chuck 178 in which it is positioned. The rod 610 is mounted for longitudinal motion in bearing plates 18 and 232, and is positioned just above rod 584. Ejection rod 610 carries a collar 614, a spring 616 being disposed between the collar and bearing plate 232 normally urging the rod 610 toward the work. A lever 618 is fulcrumed on a pin 620 mounted on a bracket 622 connected to the frame member or bearing plate 18, and the upper end of the lever 618 carries a cam roller 624 which makes contact with a cam 626 mounted on the cam jack shaft 264. When the cam roller rides onto the low portion 628 of cam 626, lever 618 pivots counterclockwise to permit rod 610 under the action of spring 616, to move towards the screw 2 to contact the screw and eject it. After the ejection of the screw the cam follower 624 rides onto the high portion of cam 626, retracting the rod 610 against the action of spring 616 to the position shown in Figs. 7 and 28b.

The ejected screw, viewing now Figs. 59 and 60, is thrown into a chute 630 which is downwardly inclined to permit the screw to drop by gravity to the bottom of the chute and into a receptacle 632 positioned on a platform 634 connected to the machine by means of bolts 636. The chute 630 is supported at its lower end on the machine platform 275a by means of a lip 638 on the lower end of the chute, said lip resting on the edge of the platform 275a.

Drive system of the machine

Viewing particularly Figs. 1, 6 and 61, a chain 640 connects a sprocket 642 on the drive shaft of the main motor 644 with a sprocket 646 on cam shaft 267, for driving the cam 265 (see Fig. 28c), cam 418 (see Fig. 40), the two drill cams 470 (see Figs. 6 and 34), and the cam 514 (see Fig. 45). A belt 648 connects a pulley on the drive shaft of the main motor 644 with a pulley 649 mounted on a sleeve 652 which is mounted for free rotation on shaft 267 and held in axial position by collars 653 on shaft 267. Belt 648 is tensioned by roller 653'. At the other end of sleeve 652 is mounted a pulley 654 which receives the belt 22 for driving pulley 20 (see Fig. 2). A chain 656 is connected between a sprocket 658 on shaft 267 and a sprocket 660 on a shaft 662 connected to a bracket 664 mounted on plate 229, said chain being tensioned by roller 65. Shaft 662 carries a pulley 666, and the belt 52 connects pulley 50 (see Fig. 2) with the pulley 666. A chain 668 connects another sprocket (not shown) on shaft 662 with a sprocket 670 on the cam jack shaft 264, the slack in chain 668 being taken up by tension roller 672 (see also Figs. 1 and 33). The cam jack shaft, viewing Figs. 1, 28a, 33 and 61, carries cam 32 (see Fig. 11), cam 262 (see Fig. 28d), cam 334, cam 536, gear 274 and clutch 271 (see Fig. 30).

Referring particularly to Figs. 1 and 61, each of the two multiple pulleys 550 on both sides of the machine is driven by a belt 674 engaging a center large groove 676 (see also Fig. 7) in the pulley, each of said belts engaging a driving pulley 678 on axially aligned shafts 680 positioned in bearings 682 connected to the machine frame 684 below the machine platform 275a. Each of the shafts 680 has a collar 686 mounted on adjacent inner ends of the shafts, and each of said shafts carries a second pulley 688 which is driven by a belt 690 from a pulley 692 on the drive shaft of auxiliary motors 694 mounted on the base 15'. As illustrated in Figs. 49, 56 and 57, a belt 495 connects each of the pulleys 493 on each of the drill quills 478 of drills 476, with a separate shallow groove 553 on both sides of the central large groove 676 of the multiple pulleys.

Hence it is seen that the shafts 264 and 267 on which the various cams for operation of the machine are mounted, are continuously driven from the main motor 644, while all of the drills 476 are continuously driven from the two auxiliary motors 694, via the multiple pulleys 550.

From the foregoing, it is seen that there is provided by the invention a compact, completely automatic machine which carries out a plurality of successive operations in timed sequence, for drilling a hole into the head of a screw normal to the axis thereof and at a preselected angle to the slot in the head of the screw. The invention machine embodies a series of mechanisms which cooperate with each other to produce the desired result.

These mechanisms include the dial structure for supporting a series of screws for movement thereof from station to station. The dial is designed to hold a plurality of screws so that each screw on the dial is being operated upon simultaneously at the various stations. In this manner the machine is able to attain a maximum of production over a given period. The novel screw orienting device, screw gripper actuating mechanism, drill actuating mechanism, and structure for rotating the dial all cooperate in timed relation with the dial structure to carry out the various operations on the screws supported on the dial. The inspection drill and its switch actuating means assure that the screws discharged from the dial have been properly drilled. The machine requires a minimum of supervision and is highly reliable in operation.

While I have described a particular embodiment of my invention for the purpose of illustration, it should be understood that various modifications and adaptations thereof may be made within the spirit of the invention as set forth in the appended claims.

I claim:

1. A drilling machine for drilling a hole through the head of a screw which comprises a rotatable dial, means for feeding successive screws to said dial at one position thereof constituting a first station, means in said dial for receiving said screw, means to hold a screw in rotatable position at said first station in said dial, a rotatable screw driver for engaging the slot in the head of said screw and rotating it to orient the screw in a predetermined position in the dial, means for actuating said screw driver when said screw is fed to said dial; said last named means including cam means for lowering said screw driver into contact with the head of a screw and for raising said screw driver from the head of a screw, means including a clutch for rotating said screw driver, means for maintaining said screw driver in contact with the head of said screw when said screw driver is in lowered position, to cause the screw driver to register with the slot in the head of the screw for rotation thereof, stop means to interrupt rotation of said screw driver when said screw driver has registered with the slot in said screw and has rotated said screw to a predetermined orientation of the slot therein, said clutch including means to produce slippage of said means for rotating said screw driver while said screw driver is in contact with said stop means, said cam means actuating said screw driver to raise the same after contact thereof with said stop means and to thereafter lower said screw driver into operative position free from contact with said stop means; a plurality of drills positioned at spaced interval stations circumferentially about the outer periphery of said dial, means for intermittent rotation of said dial to move said screw to successive stations adjacent the respective drills and to a subsequent discharge station beyond the last drilling station, means for retracting and advancing said drills to drill a hole into the head of said screw when said dial advances said screw to said respective drill stations, said means for holding said screw in said dial including means for preventing rotation of said screw during rotation of said dial to said respective drill stations and to said discharge station, and means for discharging said screw from said dial on advancement of said screw to said discharge station.

2. A drilling machine as defined in claim 1, wherein said means for actuating said screw driver includes a cam, a rotatable shaft, said cam being mounted on said shaft, a cam follower connected at one end to said cam, a rock shaft, said cam follower being connected at its other end to said rock shaft, an arm connected to said rock shaft and to said screw driver to lower the same into contact with the head of a screw and to raise said screw driver from the head of a screw, in response to motion of said rock shaft, a first gear freely mounted on said rotatable shaft, a second smaller gear connected to said screw driver, said gears meshing to drive said screw driver, a clutch on said rotatable shaft, said clutch being connected to said first gear and providing slippage thereof with respect to said rotatable shaft, a spring on said screw driver for maintaining said screw driver in contact with the head of said screw when said screw driver is in lowered position, to cause the screw to register with the slot in the head of the screw and cause rotation thereof, a stop adjacent said screw driver in its lower position, a lug on said screw driver adapted to contact said stop and to interrupt rotation of said screw driver when said screw driver has registered with the slot in said screw and has rotated it to a position where said slot is positioned perpendicular to the axis of said dial, said clutch including means to provide slippage of said gears with respect to said rotatable shaft while said lug is in contact with said stop, said cam actuating said rock shaft and said arm to raise said screw driver after contact between said lug and said stop, and to thereafter lower said screw driver into operative position with the lug thereon displaced angularly from said stop and out of contact therewith.

3. A drilling machine as defined in claim 2, wherein said clutch includes a disc in contact with a face of said first gear, a collar mounted on said rotatable shaft adjacent said disc, spring means mounted on said collar and connected to said disc, said spring means urging said disc into engagement with said first gear, the gear ratio of said first and second gears being greater than 2 and less than 3.

4. A drilling machine for drilling a hole through the head of a screw which comprises a rotatable dial, means in said dial for receiving a screw, means for feeding a screw to said last named means in said dial at one position thereof constituting a first station, a pivotally mounted spring pressed gripper on said dial, said gripper being positioned adjacent said screw receiving means and being normally urged in a direction to contact the shank of a screw in the dial to hold said screw in non-rotatable position in said dial, an elongated first rod having one end thereof disposed adjacent said gripper at said first station, means mounting said rod intermediate its ends for rocking motion of said rod about said mounting means, a first cam means connected to the opposite end of said rod for rocking said rod to cause said one end thereof to contact said gripper at said first station to open said gripper during feeding of said screw to said screw receiving means of said dial, said cam means also providing rocking motion of said rod to an intermediate position to cause said rod to contact said gripper so as to merely relieve the tension therein and hold said screw in rotatable position while maintaining said gripper in contact with the shank of said screw to support same in said dial, screw driver means at said first station for engaging the slot in the head of said screw and rotating it to orient the slot to a predetermined position in said dial, a plurality of drills positioned at spaced interval stations circumferentially about the outer periphery of said dial, means for intermittent rotation of said dial to move said screw to successive stations adjacent the respective drills and to a subsequent discharge station beyond the last drilling station, means for retracting and advancing said drills to drill a hole into the head of said screw when said dial advances said screw to said respective drill stations, a second cam means connected to said rod for longitudinal movement thereof to withdraw the adjacent end of said rod from said gripper for free rotation of said dial from station to station, a second rod mounted for rocking motion intermediate its ends, one end of said second rod being disposed adjacent a gripper on said dial at said discharge station, said first cam means being connected to the opposite end of said second rod for rocking said rod to cause said one end thereof to contact said gripper at said discharge station to open said gripper for discharge of said screw from said screw receiving means of said dial, said second cam means being connected to said second rod and providing longitudinal movement thereof to withdraw said one end of said second rod from the adjacent gripper at said discharge station and provide free rotation of said dial, said rods being actuated simultaneously by said first and second cam means, and means for discharging said screw from said dial at said discharge station.

5. A drilling machine as defined in claim 4, wherein said first and second rods are disposed adjacent each other, said machine including a frame member, a pair of slots in said member, the adjacent opposite ends of said rods each being disposed in a separate one of said slots, and wherein said first cam means includes a cam, a follower for said cam, a pivoted lever connected to said follower, a spring connected to said lever to maintain said follower against said cam, the adjacent opposite ends of said rods being connected to said lever, and wherein said second cam means includes a cam, a cam follower, said follower being connected to said rods intermediate the ends thereof, and a spring connected to each of said rods, said springs normally biasing said rods in a direction toward said dial and maintaining said last named cam follower against said last named cam.

6. A drilling machine for drilling a hole through the head of a screw which comprises a rotatable dial, means for feeding a screw to said dial at one position thereof constituting a first station, said dial being in the form of a disc having a plurality of notches in the outer periphery thereof, a screw receiving and positioning member disposed in each of said notches, said member having a seat to support the head of a screw and a recess to receive the shank of a screw and to support same in radial alignment in said dial with the head of said screw disposed beyond the outer periphery of said dial, a pivotally mounted spring biased gripper on said dial adjacent each of said members, each of said grippers having a jaw adapted to enter the recess in the adjacent screw receiving and supporting member to grip the shank of a screw positioned in said recess, a shaft for said dial, means for intermittent rotation of said dial shaft and dial to move each of said screw receiving and supporting members, each adapted to carry a screw therein, to a plurality of stations disposed about said dial including said first feed station, means to open the jaw of the gripper at said first station during feeding of a screw to the adjacent screw receiving member positioned at said station, said last named means including means to partially close said gripper at said first station to hold a screw in rotatable position in said last mentioned screw receiving member by light contact of the jaw of said last named gripper with the shank of said screw at said first station, screw driver means at said first station for engaging the slot in the head of said screw and rotating it to orient said slot to a predetermined position, a plurality of drills positioned at spaced interval stations circumferentially about the outer periphery of said dial, the dial being rotatable to each of said drill stations and to a subsequent discharge station beyond the last drilling station, means for retracting and advancing said drills to drill a hole into the head of said screw when said dial advances said screw to said respective drill stations, means at said discharge station to open the jaw of the gripper on the dial adjacent said discharge station to release said jaw from contact with a screw, and means for discharging said screw from said dial on advancement of said screw to said discharge station.

7. A drilling machine as defined in claim 6, including a rotatable cam, a pivoted lever connected to and actuated by said cam, a lug at one end of said lever, a plurality of second notches in said dial, said second notches being disposed at intervals about said dial between said screw receiving and supporting members in said dial, said lug mating with said second notches, said lever being actuated by said cam to move said lug into an adjacent one of said second notches following rotation of said dial from one of said stations to a succeeding station, and to retract said lug after a period of non-rotation of said dial, a second pivoted lever disposed adjacent said dial at the first drill station, and a second rotatable cam, said second lever being connected to said second cam for actuation of the latter lever to pivot the end thereof into and out of engagement with the head of a screw at the first drill station.

8. A drilling machine as defined in claim 6, including means for adjusting the position of said grippers and their jaws to contact the shank of different size screws, and wherein there are ten of said notches in said dial spaced approximately 36° apart, each of said screw receiving and positioning members being in the form of a chuck having a first recess therein disposed radially of said dial, said chuck being cut away at one side for entry of the jaw of the adjacent gripper into said recess to grip the shank of a screw disposed therein, said chuck having a supporting lug extending over the cut-away portion for supporting the head of a screw, each of said grippers being fork-shaped and having an upper and a lower fork, the upper fork having a bent end portion forming the jaw of said gripper, the lower fork being bifurcated, a second recess in the periphery of said dial adjacent each of the chucks therein, said second recesses each communicating with the cut away portion of said chuck, a series of second notches in said dial, equal to the number of peripherally disposed notches, each of said second notches being spaced radially inward from the adjacent peripheral notch, the upper fork and jaw of each gripper being disposed in a separate one of said recesses and the lower bifurcated fork of each gripper being disposed in an adjacent one of said second notches, a pivot pin passing through both forks of each of said grippers, and through said second notches, said pin having a reduced portion in registry with the slot in said bifurcated lower fork of each of said grippers, a snap ring disposed in registry with said reduced portion and the slot in said bifurcated fork to prevent longitudinal movement of said pivot pin with respect to said gripper, means to prevent rotation of said pivot pin, a plurality of springs, each connected at one end to the outer portion of one of said grippers and at its other end to said dial, said springs normally urging the jaw of each of said grippers into the recess in the adjacent chuck to grip the shank of a screw therein, said means to open the jaws of said grippers to pivot the gripper jaws out of the recesses in said chucks against the action of said springs.

9. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means to hold a screw in position in said dial, means for orienting the slot in the head of said screw with respect to the axis of said dial, a plurality of drills positioned at spaced interval stations circumferentially about the outer periphery of said dial, means for intermittent rotation of said shaft and dial to move said screw to successive stations adjacent the respective drills and to a subsequent discharge station beyond the last drilling sation, said last named means including an index plate fixedly mounted on said dial shaft, said index plate having a plurality of apertures disposed therein and angularly spaced in correspondence with the angular spacing of said stations about said dial, a mating plate mounted on said dial shaft adjacent said index plate, said mating plate being slidably and rotatably disposed with respect to said dial shaft, a plurality of pins mounted on said mating plate and angularly positioned thereon in alignment with the apertures in said index plate, said pins being adapted to mate with the respective adjacent apertures in said index plate, biasing means urging said mating plate into engagement with said index plate with said pins inserted in said apertures, cam actuated means connected to said mating plate, said cam actuated means being operative to rotate said mating plate and the engaged index plate an amount corresponding to the angular distance between the apertures in said index plate and between the stations about said dial, and means urging said mating plate away from said index plate against the action of said biasing means, following rotation of said index plate, to withdraw said pins from said apertures; means for retracting and advancing said drills to drill a hole into the head of said screw when said dial advances said screw to said respective drill stations, and means for discharging said screw from said dial on advancement of said screw to said discharge station.

10. A drilling machine as defined in claim 9, said means for intermittent rotation of said dial shaft and said dial including a spring disposed about said dial shaft, said spring urging said mating plate into engagement with said index plate, a slidable sleeve on said dial shaft, a plurality of second pins carried by said index plate, said second pins being mounted in said index plate for axial slidable movement, said second pins abutting said sleeve and said mating plate, and means urging said sleeve and said second pins against said mating plate to separate said last named plate from said index plate following rotation of said index plate.

11. A drilling machine as defined in claim 10, said cam actuated means for rotating said mating plate including an arm connected to said mating plate, a reciprocably mounted hollow rod, a universal type connection between said arm and said rod, for rotary and axial movement of said arm and mating plate, a cam, a cam follower connected to said cam, the opposite end of said follower being connected to one end of said rod, a second fixed rod slidably received in said hollow rod, a light spring in said hollow rod abutting the end of said fixed rod and urging said hollow rod and cam follower toward said cam, a heavy spring mounted in spaced relation from the other end of said rod, an axially slidable second sleeve about said fixed rod, and disposed between said heavy spring and said opposite end of said hollow rod, said heavy spring normally urging said second sleeve toward said other end of said rod, and stop means to limit axial movement of said second sleeve in a direction toward said other end of said rod.

12. A drilling machine as defined in claim 9, said cam actuated means for rotating said mating plate including a reciprocably mounted rod, a connection between said plate and said rod, for rotary and axial movement of said mating plate, a cam, a cam follower connected to said cam, the opposite end of said follower being connected to one end of said rod, a light spring connected to said rod and urging said rod and cam follower toward said cam, a heavy spring mounted in spaced relation from the other end of said rod, an axially slidable connection between said heavy spring and said opposite end of said rod, said heavy spring normally urging said slidable connection toward said other end of said rod, and stop means to limit axial movement of said slidable conection in a direction toward said other end of said rod.

13. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means for orienting the slot in the head of said screw with respect to the axis of said dial, means to hold a screw in position in said dial, a plurality of drills positioned at spaced interval stations circumferentially about the outer periphery of said dial, each of said drills comprising a drill stem connected to said drill, a quill mounted for rotation, means for rotating said quill, said stem being mounted axially in said quill for rotation therewith, and means providing limited axial movement of said stem with respect to said quill, means for intermittent rotation of said shaft and said dial to move said screw to successive stations adjacent each of said drills and to a subsequent discharge station beyond the last drilling station, means for retracting and advancing each of the drills to drill a hole into the head of said screw when said dial advances said screw to said respective drill stations, means for limiting the degree of advancement of said drills, said two last named means including a lever pivotally mounted adjacent each of said drills, one end of each of said levers being in contact with the drill stem of the adjacent drill, said levers being radially disposed with respect to said dial, a spring connected to the drill stem of each of said drills, said spring urging said drill stem and associated drill in one direction, cam actuated means, a movable connection between said last named means and the opposite end of each of said levers, said movable connection being mounted for axial movement on said dial shaft, said cam actuated means imparting limited motion to said connection for controlled pivotal movement of each of said levers to produce limited axial motion of each of said drills in a direction against the action of said springs, and means for adjusting the position of the pivot of each of said levers, and means for discharging said screw from said dial on advancement of said screw to said discharge station.

14. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means for orienting the slot in the head of said screw with respect to the axis of said dial, means to hold said screw positioned in said dial, a plurality of pairs of drills positioned at spaced interval stations circumferentially about the outer periphery of said dial, the two drills of each of said pairs of drills being located in alignment with each other on opposite sides of the dial, each of said drills comprising a drill stem connected to said drill, a quill mounted for rotation, means for rotating said quill, said stem being mounted axially in said quill for rotation therewith, and means providing limited axial movement of said stem with respect to said quill, means for intermittent rotation of said shaft and said dial to move said screw to successive stations adjacent each of said pairs of drills and to a subsequent discharge station beyond the last drilling station, means for retracting and advancing each of the drills of the successive pairs of drills toward each other to drill a hole into opposite sides of the head of said screw when said dial advances said screw to said respective drill stations, means for limiting the degree of advancement of the drills of each of the successive pairs of drills, said two last named means including a lever pivotally mounted adjacent each of said drills, one end of each of said levers being in contact with the outer end of the drill stem of the adjacent drill, said levers being radially disposed with respect to said dial, the outer portion of the drill stems of each of said drills protruding from the end of its quill, a spring disposed about said outer portion of each of said drills and urging said drill stems and drills in a direction away from said dial, a first sleeve mounted on said dial shaft and movable axially thereon, a connection between said sleeve and the other ends of the drill levers of the drills on one side of said dial, a cam, a rotatable shaft mounting said cam, a cam follower connected to said cam, a lever system connecting said cam follower and said sleeve to impart limited motion to said sleeve, said sleeve thereby imparting controlled pivotal motion to the radially disposed drill levers on said one side of said dial to produce axial motion of each of said drill stems and drills on said one side of said dial in a direction toward said dial against the action of said springs on said last mentioned drill stems, a second shaft in alignment with said dial shaft on the other side of said dial, a second sleeve mounted on said second shaft and movably axially thereon, a connection between said second sleeve and the other ends of the drill levers of the drills on the other side of said dial, a second rotatable cam, a cam follower connected to said second cam, a second lever system connecting said last named cam follower and said second sleeve to impart limited motion to said second sleeve, said second sleeve thereby imparting controlled pivotal motion to the drill levers on the other side of said dial, to produce axial motion of each of said drill stems and drills on said other side of said dial in a direction toward said dial against the action of said springs on said last mentioned drill stems, means for adjusting the position of the pivot of each of said levers so that succeeding pairs of drills can advance successively closer to each other, and means for discharging said screw from said dial on advancement of said screw to said discharge station.

15. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means for orienting the slot in the head of said screw with respect to the axis of said dial, means to hold a screw in position in said dial, a plurality of pairs of drills positioned at spaced interval stations circumferentially about said dial, the two drills of each of said pairs of said drills being located in alignment with each other on opposite sides of said dial, means for intermittently rotating said dial to present said screw at successive stations adjacent each of said pairs of drills, and at a subsequent discharge station, means for retracting and advancing each of the drills of the successive pairs of drills toward each other to drill a hole into opposite sides of the head of said screw at said respective stations, means for limiting the degree of advancement of each of the successive pairs of drills, said means being adjustable so that succeeding pairs of drills can advance successively closer to each other and farther into the head of said screw, the last pair of drills each advancing to a point substantially at the center of the screw head to form a hole passing through said head, and means for discharging said screw from said dial on advancement of said screw to said discharge station.

16. A drilling machine as defined in claim 15, said means for retracting and advancing said drills including a first reciprocable member on one side of said dial, separate motion transmitting connections between said first reciprocable member and each of said drills on one side of said dial, a second reciprocable member on the other side of said dial, separate motion transmitting connections between said second reciprocable member and each of said drills on the other side of said dial, each of said first and second motion transmitting connections being pivotally mounted in motion transmitting relation between its associated reciprocable member and drill.

17. A drilling machine as defined in claim 16, wherein said motion transmitting connections each comprise a lever, and including a pivot mounting for each of said levers intermediate the ends thereof, said pivot mounting including a detent in said levers and a pivot pin received by said detent.

18. A drilling machine as defined in claim 15, wherein said first pair of drills are of substantially greater diameter than the diameter of the other drills, for forming an initial counterbore in opposite sides of the head of said screw to guide the other drills in drilling said hole.

19. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means for orienting the slot in the head of said screw with respect to the axis of said dial, means to hold a screw in position in said dial, a plurality of pairs of drills positioned at spaced interval stations circumferentially about said dial, the drills of each pair of said drills being located in alignment with each other on opposite sides of said dial, a first bur-removing drill following the last pair of said pairs of drills and positioned on one side of said dial, a second bur-removing drill spaced angularly from said first bur-removing drill on the opposite side of said dial from said last named drill, means for intermittently rotating said dial to present said screw at successive stations adjacent each of said pairs of drills, said first and second bur-removing drills, and at a subsequent discharge station, means for advancing each of the successive pairs of drills toward each other to drill a hole into opposite sides of the head of said screw at said respective stations, means for limiting the degree of advancement of each of the successive pairs of drills, said means being adjustable to permit succeeding pairs of drills to advance succesively closer to each other and farther into the head of said screw, the last pair of drills each advancing to a point substantially at the center of the screw head to form a hole passing through said head, means for advancing said first bur-removing drill into one end of the hole in the screw head and past the center of said hole when the screw is advanced by said dial to the station adjacent said first bur-removing drill, means for advancing the second bur-removing drill into the other end of said hole and past the center thereof when the screw is advanced by said dial to the station adjacent said second bur-removing drill, means for retracting all of said drills after the period of advancement thereof, and means for discharging said screw from said dial on advancement of said screw to said discharge station.

20. A drilling machine for drilling a hole through the head of a screw which comprises a rotatable dial, means for feeding a screw to said dial at one position thereof constituting a first station, said dial being in the form of a disc having a plurality of notches in the outer periphery thereof, a screw receiving and positioning member disposed in each of said notches, said member having a seat to support the head of a screw and a recess to receive the shank of a screw and to support same in radial alignment in said dial with the head of said screw disposed beyond the outer periphery of said dial, a pivotally mounted spring biased gripper on said dial adjacent each of said members, each of said grippers having a jaw adapted to enter the recess in the adjacent screw receiving and supporting member to grip the shank of a screw positioned in said recess, a shaft for said dial, means for intermittent rotation of said dial shaft and dial to move each of said screw receiving and supporting members, each adapted to carry a screw therein, to a plurality of stations disposed about said dial including said first feed station, an elongated first rod having one end thereof disposed adjacent said gripper at said first station, means mounting said rod intermediate its ends for rocking motion of said rod about said mounting means, a first cam means connected to the opposite end of said rod for rocking said rod to cause said one end thereof to contact said gripper at said first station to open said gripper and permit feeding of said screw to said screw receiving member of said dial, said cam means also providing rocking motion of said rod to an intermediate position to cause said rod to contact said gripper so as to merely relieve the tension therein and permit rotation of said screw while maintaining said gripper in contact with the shank of said screw to support same in said dial, screw driver means for engaging the slot in the head of said screw and rotating it to orient said slot to a predetermined position, a plurality of drills positioned at spaced interval stations circumferentially about the outer periphery of said dial, the dial being rotatable to each of said drill stations and to a subsequent discharge station beyond the last drilling station, means for retracting and advancing said drills to drill a hole into the head of said screw when said dial advances said screw to said respective drill stations, a second cam means connected to said rod for longitudinal movement thereof to withdraw the adjacent end of said rod from said gripper and provide free rotation of said dial from station to station, a second rod mounted for rocking motion intermediate its ends, one end of said second rod being disposed adjacent a gripper on said dial at said discharge station, said first cam means being connected to the opposite end of said second rod for rocking said rod to cause said one end thereof to contact said gripper at said discharge station to open said gripper for discharge of said screw from said screw receiving means of said dial, said second cam means being connected to said second rod to provide longitudinal movement thereof to withdraw said one end of said second rod from the adjacent gripper at said discharge station and provide free rotation of said dial, said rods being actuated simultaneously by said first and second cam means, and means for discharging said screw from said dial at said discharge station.

21. A drilling machine for drilling a hole through the head of a screw which comprises a rotatable dial, means for feeding a screw to said dial at one position thereof constituting a first station, said dial being in the form of a disc having a plurality of notches in the outer periphery thereof, a screw receiving and positioning member disposed in each of said notches, said member having a seat to support the head of a screw and a recess to receive the shank of a screw and to support same in radial alignment in said dial with the head of said screw disposed beyond the outer periphery of said dial, a pivotally mounted spring biased gripper on said dial adjacent each of said members, each of said grippers having a jaw adapted to enter the recess in the adjacent screw receiving and supporting member to grip the shank of a screw positioned in said recess, a shaft for said dial, means for intermittent rotation of said dial shaft and dial to move each of said screw receiving and supporting members, each adapted to carry a screw therein, to a plurality of stations disposed about said dial including said first feed station, means to open the jaw of the gripper at said first station for feeding of a screw to the adjacent screw receiving member positioned at said station, said last named means including means to partially close said gripper at said first station to hold a screw in position in said last mentioned screw receiving member by light contact of the jaw of said last named gripper with the shank of said screw at said first station, screw driver means for engaging the slot in the head of said screw and rotating it to orient said slot to a predetermined position, a plurality of drills positioned at spaced interval stations circumferentially about the outer periphery of said dial, each of said drills comprising a drill stem connected to said drill, a quill mounted for rotation, means for rotating said quill, said stem being mounted axially in said quill for rotation therewith, and means providing limited axial movement of said stem with respect to said quill, means for retracting and advancing each of the drills to drill a hole into the head of said screw when said dial advances said screw to said respective drill stations, means for limiting the degree of advancement of said drills, said two last named means including a lever pivotally mounted adjacent each of said drills, one end of each of said levers being in contact with the drill stem of the adjacent drill, said levers being radially disposed with respect to said dial, a spring connected to the drill stem of each of said drills, said spring urging said drill stem and associated drill in one direction, cam actuated means, a movable connection between said last named means and the opposite end of each of said levers, said movable connection being mounted for axial movement on said dial shaft, said cam actuated means imparting limited motion to said connection for controlled pivotal movement of each of said levers to produce limited axial motion of each of said drills in a direction against the action of said springs, and means for adjusting the position of the pivot of each of said levers, a discharge station adjacent said dial beyond the last drill station, and means at said discharge station to open the jaw of the gripper on the dial adjacent said discharge station to release said jaw from contact with a screw, and means for discharging said screw from said dial on advancement of said screw to said discharge station.

22. A drilling machine as defined in claim 6, said means for intermittent rotation of said dial shaft and dial including an index plate fixedly mounted on said dial shaft, said index plate having a plurality of apertures disposed therein and angularly spaced in correspondence with the angular spacing of said stations about said dial, a mating plate mounted on said dial shaft adjacent said index plate, said mating plate being slidably and rotatably disposed with respect to said dial shaft, a plurality of pins mounted on said mating plate and angularly positioned thereon in alignment with the apertures in said index plate, said pins being adapted to mate with the respective adjacent apertures in said index plate, biasing means urging said mating plate into engagement with said index plate with said pins inserted in said apertures, cam actuated means connected to said mating plate, said cam actuated means being operative to rotate said mating plate and the engaged index plate an amount corresponding to the angular distance between the apertures in said index plate and between the stations about said dial, and means urging said mating plate away from said index plate against the action of said biasing means, following rotation of said index plate, to withdraw said pins from said apertures.

23. A drilling machine as defined in claim 6, said screw driver means including a screw driver, cam means for lowering said screw driver into contact with the head of a screw and for raising said screw driver from the head of a screw, means for rotating said screw driver, means for maintaining said screw driver in contact with the head of said screw when said screw driver is in lowered position, and to permit the screw driver to register with the slot in the head of the screw and cause rotation thereof, stop means to interrupt rotation of said screw driver when said screw driver has registered with the slot in said screw and has rotated said screw to a predetermined orientation of the slot therein, a clutch permitting slippage of said means for rotating said screw driver while said screw driver is in contact with said stop means, said cam means actuating said screw driver to raise the same after contact thereof with said stop means.

24. A drilling machine for drilling a hole through the head of a screw which comprises a rotatable dial, means for feeding successive screws to said dial at one position thereof constituting a first station, means in said dial for receiving said screw, means to hold a screw in rotatable position at said first station in said dial, a rotatable screw driver for engaging the slot in the head of said screw and rotating it to orient the screw in a predetermined position in the dial, means for actuating said screw driver when said screw is fed to said dial, said last named means including means for lowering and raising said screw driver, means for rotating said screw driver, means for maintaining said screw driver in contact with the head of said screw when said screw driver is in lowered position, to cause the screw driver to register with the slot in the head of the screw for rotation thereof, means to interrupt rotation of said screw driver when said screw driver has registered with the slot in said screw and has rotated said screw to a predetermined orientation of the slot therein, means to disengage said screw driver from said means for rotating said screw driver on interruption of rotation of said screw driver by said interrupting means, said means for raising and lowering said screw driver actuating said screw driver to raise the same after rotation of said screw driver has been interrupted; a plurality of drills positioned at spaced interval stations circumferentially about the outer periphery of said dial, means for intermittent rotation of said dial to move said screw to successive stations adjacent the respective drills and to a subsequent discharge station beyond the last drilling station, means for retracting and advancing said drills to drill a hole into the head of said screw when said dial advances said screw to said respective drill stations, means for preventing rotation of said screw during rotation of said dial to said respective drill stations and to said discharge station, and means for discharging said screw from said dial on advancement of said screw to said discharge station.

25. A drilling machine as defined in claim 6, said screw driver means including a screw driver, means for lowering and raising said screw driver, means for rotating said screw driver, means for maintaining said screw driver in contact with the head of said screw when said screw driver is in lowered position, and to permit the screw driver to register with the slot in the head of the screw and cause rotation thereof, means to interrupt rotation of said screw driver when said screw driver has registered with the slot in said screw and has rotated said screw to a predetermined orientation of the slot therein, means permitting slippage of said means for rotating said screw driver on interruption of rotation of said screw driver, said means for raising and lowering said screw driver actuating said screw driver to raise the same after rotation of said screw driver has been interrupted; a plurality of drills positioned at spaced interval stations circumferentially about the outer periphery of said dial, means for intermittent rotation of said dial to move said screw to successive stations adjacent the respective drills and to a subsequent discharge station beyond the last drilling station, means for retracting and advancing said drills to drill a hole into the head of said screw when said dial advances said screw to said respective drill stations, said means for holding said screw in said dial including means for preventing rotation of said screw during rotation of said dial to said respective drill stations and to said discharge station, and means for discharging said screw from said dial on advancement of said screw to said discharge station.

26. A drilling machine for drilling a hole through the head of a screw which comprises a rotatable dial, means in said dial for receiving a screw, means for feeding a screw to said last named means in said dial at one position thereof constituting a first station, a pivotally mounted spring pressed gripper on said dial, said gripper being positioned adjacent said screw receiving means and being normally urged in a direction to contact the shank of a screw in the dial to hold said screw in non-rotatable position in said dial, an elongated first rod having one end thereof disposed adjacent said gripper at said first station, means mounting said rod intermediate its ends for rocking motion of said rod about said mounting means, a first means connected to said rod for rocking said rod to cause said one end thereof to contact said gripper at said first station to open said gripper during feeding of said screw to said screw receiving means of said dial, said first means also providing rocking motion of said rod to an intermediate position to cause said rod to contact said gripper so as to merely relieve the tension therein and hold said screw in rotatable position while maintaining said gripper in contact with the shank of said screw to support same in said dial, screw driver means at said feed station for engaging the slot in the head of said screw and rotating it to orient the slot to a predetermined position in said dial, a pluraltiy of drills positioned at spaced interval stations circumferentially about the outer periphery of said dial, means for intermittent rotation of said dial to move said screw to successive stations adjacent the respective drills and to a subsequent discharge station beyond the last drilling station, means for retracting and advancing said drills to drill a hole into the head of said screw when said dial advances said screw to said respective drill stations, a second means connected to said first rod for longitudinal movement thereof to withdraw the adjacent end of said rod from said gripper for free rotation of said dial from station to station, a second rod mounted for rocking motion intermediate its ends, one end of said second rod being disposed adjacent a gripper on said dial at said discharge station, said first means connected to said first rod also being connected to said second rod for rocking the second rod to cause said one end thereof to contact said gripper at said discharge station to open said gripper for discharge of said screw from said screw receiving means of said dial, said second means connected to said first rod also being connected to said second rod for longitudinal movement thereof to withdraw said one end of said second rod from the adjacent gripper at said discharge station to provide free rotation of said dial, and means for discharging said screw from said dial at said discharge station.

27. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means to hold a screw in position in said dial, means for orienting the slot in the head of said screw with respect to the axis of said dial, a plurality of drills positioned at spaced interval stations circumferentially about the outer periphery of said dial, means for intermittent rotation of said shaft and dial to move said screw to successive stations adjacent the respective drills and to a subsequent discharge station beyond the last drilling station, said last named means including an index plate fixedly mounted on said dial shaft, a mating plate mounted on said dial shaft adjacent said index plate, said mating plate being free for slidable and rotatable motion with respect to said dial shaft, one of said two last named plates having a plurality of apertures disposed therein and angularly spaced in correspondence with the angular spacing of said stations about said dial, the other of said plates having a plurality of pins mounted thereon and angularly positioned thereon in alignment with said apertures, said pins being adapted to mate with said apertures, biasing means urging said mating plate into engagement with said index plate with said pins inserted in said apertures, means connected to said mating plate, said means being operative to rotate said mating plate and the engaged index plate an amount corresponding to the angular distance between adjacent apertures and between the stations about said dial, and means urging said mating plate away from said index plate against the action of said biasing means, following rotation of said index plate to withdraw said pins from said apertures, means for retracting and advancing said drills to drill a hole into the head of said screw when said dial advances said screw to said respective drill stations, and means for discharging said screw from said dial on advancement of said screw to said discharge station.

28. A drilling machine for drilling a hole through the head of a screw, which comprises a rotatable dial, means for feeding successive screws to said dial at one position thereof constituting a first station, means in said dial for receiving said screw, means to hold a screw in rotatable position at said first station in said dial, a rotatable screw driver for engaging the slot in the head of said screw and rotating it to orient the screw in a predetermined position in the dial, means for lowering said screw driver into contact with the head of said screw when said screw is fed to said dial, means for rotating said screw driver and causing it to register with the slot in the head of the screw for rotation thereof, a stop adjacent said screw driver in its lowered position, a lug on said screw driver adapted to contact said stop and to interrupt rotation of said screw driver when said screw driver has registered with the slot in said screw and has rotated it to a predetermined orientation of said screw driver therein, means to cause disengagement of said screw driver for a period from said means for rotating said screw driver when said lug has contacted said stop, means for raising said screw driver out of contact with said screw after contact of said lug with said stop and during said period of disengagement, means for displacing said lug angularly from said stop when said screw driver is lowered into contact with the head of said screw, a plurality of drills positioned at spaced interval stations circumferentially about the outer periphery of said dial, means for intermittent rotation of said dial to move said screw to successive stations adjacent the respective drills and to a subsequent discharge station beyond the last drilling station, means for holding said screw securely in position on said dial and against rotation of said screw during rotation of said dial to said respective drill stations and to said discharge station, and means for discharging said screw from said dial on advancement of said screw to said discharge station.

29. A drilling machine for drilling a hole through the head of a screw, which comprises, a rotatable dial, means in said dial for receiving a screw, means for feeding a screw to said last named means in said dial at one position thereof constituting a first station, a pivotally mounted spring pressed gripper on said dial, said gripper being positioned adjacent said screw receiving means and being normally urged in a direction to contact the shank of a screw in the dial to hold said screw in non-rotatable position in said dial, an elongated first rod having one end thereof disposed adjacent said gripper at said first station, means mounting said rod intermediate its ends for rocking motion of said rod about said mounting means, a first means connected to said rod for rocking said rod to cause said one end thereof to contact said gripper at said first station to open said gripper during feeding of said screw to said screw receiving means of said dial, said first rocking means also providing rocking motion of said rod to an intermediate position to cause said rod to contact said gripper so as to relieve the tension therein and hold said screw in rotatable position while maintaining said gripper in contact with the shank of said screw to support same in said dial, rotatable screw driver means at said feed station for engaging the slot in the head of said screw and rotating it to orient the slot to a predetermined position in said dial, a plurality of drills positioned at spaced interval stations circumferentially about the outer periphery of said dial, means for intermittent rotation of said dial to move said screw to successive stations adjacent the respective drills and to a subsequent discharge station beyond the last drilling station, a second means connected to said rod for longitudinal movement thereof to withdraw the adjacent end of said rod from said gripper for free rotation of said dial from station to station, a second rod mounted for rocking motion intermediate its ends, one end of said second rod being disposed adjacent a gripper on said dial at said discharge station, means connected to said second rod for rocking the second rod to cause said one end thereof to contact said gripper at said discharge station to open said gripper for discharge of said screw from said screw receiving means of said dial, means connected to said second rod for longitudinal movement thereof to withdraw said one end of said second rod from the adjacent gripper at said discharge station to provide free rotation of said dial, and means for discharging said screw from said dial at said discharge station.

30. A drilling machine for drilling a hole through the head of a screw which comprises a rotatable dial, means for feeding a screw to said dial at one position thereof constituting a first station, said dial being in the form of a disc having a plurality of first notches in the outer periphery thereof, a screw receiving and positioning member disposed in each of said notches, a plurality of pivotally mounted spring biased grippers on said dial, each gripper being disposed adjacent one of said notches, each of said grippers having a jaw, each of said screw receiving and positioning members being in the form of a chuck having a recess therein disposed radially of said dial, said chuck being cut away at one side for entry of the jaw of the adjacent gripper into said recess to grip the shank of a screw disposed therein, said chuck having an upwardly extending lug for supporting the head of a screw, the shank of said screw being disposed in said recess, each of said grippers being fork-shaped and having an upper and a lower fork, the upper fork having a bent end portion forming the jaw of said gripper, a second recess in the periphery of said dial adjacent each of the chucks therein, said second recesses each communicating with the cut away portion of said chuck, a series of second notches in said dial, equal to the number of peripherally disposed first notches, each of said second notches being spaced radially inward from its adjacent peripheral first notch the upper fork and jaw of each gripper being disposed in a separate one of said second recesses and the lower fork of each gripper being disposed in an adjacent one of said second notches, a pivot pin passing through both forks of each of said grippers, and through said second notches, means to prevent longitudinal movement of said pivot pin with respect to said gripper, means to hold said pivot pin against rotation, said grippers each being spring biased to normally urge the jaw of each of said grippers into the recess in the adjacent chuck to grip the shank of a screw therein, means at said first station for engaging the slot in the head of said screw and orienting it to a predetermined position, a plurality of drills positioned at spaced interval stations circumferentially about the outer periphery of said dial, the dial being rotatable to each of said drill stations and to a subsequent discharge station beyond the last drilling station, means for retracting and advancing said drills to drill a hole into the head of said screw when said dial advances said screw to said respective drill stations, means at said discharge station to open the jaw of the gripper on the dial adjacent said discharge station to release said jaw from contact with a screw, and means for discharging said screw from said dial on advancement of said screw to said discharge station.

31. A drilling machine for drilling a hole through the head of a screw which comprises a rotatable dial, a dial shaft, said dial being mounted on said shaft, means for feeding successive screws to said dial at one position thereof constituting a first station, means in said dial for receiving said screw, means to hold a screw in position in said dial, a plurality of drills positioned at spaced interval stations circumferentially about the outer periphery of said dial, means for intermittent rotation of said shaft and dial to move said screw to successive stations adjacent the respective drills and to a subsequent discharge station beyond the last drilling station, said last named means including an index plate fixedly mounted on said dial shaft for rotation therewith, driving means for said index plate mounted on said shaft for slidable and rotatable motion with respect to said shaft and into and out of engagement with said index plate, means biasing said driving means toward and into engagement with said index plate, means connected to said driving means and operative to rotate said last named means and the engaged index plate an amount corresponding to the angular distance between the stations about said dial, means urging said driving means out of engagement with said index plate against the action of said biasing means following rotation of said index plate, means for advancing said drills to drill a hole into the head of said screw when said dial advances said screw to said respective drill stations, means for retracting said drills, and means for discharging said screw from said dial on advancement of said screw to said discharge station.

References Cited in the file of this patent

UNITED STATES PATENTS

| | | |
|---|---|---|
| 739,501 | Meyers | Sept. 22, 1903 |
| 1,021,242 | Fishburne | Mar. 26, 1912 |
| 1,598,655 | Petitjean | Sept. 7, 1926 |
| 2,396,941 | Corrigan | Mar. 19, 1946 |
| 2,722,698 | Green | Nov. 8, 1955 |

FOREIGN PATENTS

| | | |
|---|---|---|
| 124,559 | Australia | June 10, 1947 |